(12) United States Patent
Obradovich

(10) Patent No.: US 7,802,198 B2
(45) Date of Patent: *Sep. 21, 2010

(54) CENTRALIZED CONTROL AND MANAGEMENT SYSTEM FOR AUTOMOBILES

(75) Inventor: Michael L. Obradovich, San Clemente, CA (US)

(73) Assignee: American Calcar, Inc., Las Vegas, NV (US)

( * ) Notice: Subject to any disclaimer, the term of this patent is extended or adjusted under 35 U.S.C. 154(b) by 1086 days.

This patent is subject to a terminal disclaimer.

(21) Appl. No.: 11/417,474

(22) Filed: May 3, 2006

(65) Prior Publication Data

US 2006/0277495 A1 Dec. 7, 2006

Related U.S. Application Data

(63) Continuation of application No. 09/923,125, filed on Aug. 6, 2001, now Pat. No. 7,043,699, which is a continuation of application No. 08/904,855, filed on Aug. 1, 1997, now Pat. No. 6,275,231.

(51) Int. Cl.
G06F 5/00 (2006.01)
G06F 15/00 (2006.01)
(52) U.S. Cl. ...................... 715/790; 715/810
(58) Field of Classification Search ......... 715/762–765, 715/790, 810, 851–854; 701/1, 29
See application file for complete search history.

(56) References Cited

U.S. PATENT DOCUMENTS

| 3,582,926 | A | 6/1971 | Hassan |
| 4,291,749 | A | 9/1981 | Ootsuka et al. |
| 4,314,232 | A | 2/1982 | Tsunoda |
| 4,337,821 | A | 7/1982 | Saito |
| 4,401,848 | A | 8/1983 | Tsunoda |
| 4,407,564 | A | 10/1983 | Ellis |
| 4,419,730 | A | 12/1983 | Ito et al. |
| 4,441,405 | A | 4/1984 | Takeuchi |
| 4,481,584 | A | 11/1984 | Holland |
| 4,528,563 | A | 7/1985 | Takeuchi |

(Continued)

FOREIGN PATENT DOCUMENTS

DE 4431070 3/1996

(Continued)

OTHER PUBLICATIONS

Weber, J. Williams et al., "A Systems Approach to the Development of an Integrated Crash Avoidance Vehicle", Delco Electronics Corporation, Aug. 31-Sep. 2, 1994, pp. 431-434, Vehicle Navigation and Information Systems Conference Proceedings, Yokohama, Japan.

(Continued)

Primary Examiner—Cao "Kevin" Nguyen
(74) Attorney, Agent, or Firm—Klein, O'Neill & Singh, LLP

(57) ABSTRACT

In a control and management system for automobiles, a central processor in the system connects traditionally unrelated vehicle subsystems together to realize synergistic functions such as smart driving, automatic parking, etc. A master interface having a display is employed in the system to help a user control and manage the vehicle functions.

98 Claims, 17 Drawing Sheets

U.S. PATENT DOCUMENTS

| | | | |
|---|---|---|---|
| 4,536,739 A | 8/1985 | Nobuta | |
| 4,582,389 A | 4/1986 | Wood et al. | |
| 4,636,782 A | 1/1987 | Nakamura et al. | |
| 4,653,003 A | 3/1987 | Kirstein | |
| 4,716,458 A | 12/1987 | Heitzman et al. | |
| 4,731,769 A | 3/1988 | Schaefer et al. | |
| 4,740,779 A | 4/1988 | Cleary et al. | |
| 4,740,780 A | 4/1988 | Brown et al. | |
| 4,750,213 A * | 6/1988 | Novak | 455/3.01 |
| 4,752,824 A | 6/1988 | Moore | |
| 4,787,039 A | 11/1988 | Murata | |
| 4,795,223 A | 1/1989 | Moss | |
| 4,809,177 A | 2/1989 | Windle et al. | |
| 4,811,240 A | 3/1989 | Ballou et al. | |
| 4,812,843 A | 3/1989 | Champion, III et al. | |
| 4,818,048 A | 4/1989 | Moss | |
| 4,827,520 A | 5/1989 | Zeinstra | |
| 4,831,363 A | 5/1989 | Wolf | |
| 4,837,551 A | 6/1989 | Iino | |
| 4,876,594 A | 10/1989 | Schiffman | |
| 4,914,705 A | 4/1990 | Nigawara | |
| 4,970,701 A | 11/1990 | Kirkland | |
| 4,977,509 A | 12/1990 | Pitchford et al. | |
| 4,988,976 A | 1/1991 | Lu | |
| 4,995,258 A | 2/1991 | Frank | |
| 4,996,959 A | 3/1991 | Akimoto | |
| 5,006,829 A | 4/1991 | Miyamoto et al. | |
| 5,043,736 A | 8/1991 | Darnell et al. | |
| 5,051,735 A | 9/1991 | Furukawa | |
| 5,070,323 A | 12/1991 | Iino et al. | |
| 5,119,504 A | 6/1992 | Durboraw, III | |
| 5,124,915 A | 6/1992 | Krenzel | |
| 5,157,614 A | 10/1992 | Kashiwazaki et al. | |
| 5,164,904 A | 11/1992 | Sumner | |
| 5,198,797 A | 3/1993 | Daidoji | |
| 5,203,499 A | 4/1993 | Knittel | |
| 5,214,413 A | 5/1993 | Okabayashi et al. | |
| 5,214,707 A | 5/1993 | Fujimoto et al. | |
| 5,214,793 A | 5/1993 | Conway et al. | |
| 5,235,633 A | 8/1993 | Dennison et al. | |
| 5,239,700 A | 8/1993 | Guenther et al. | |
| 5,257,190 A | 10/1993 | Crane | |
| 5,267,159 A | 11/1993 | O'Neall | |
| 5,270,689 A | 12/1993 | Hermann | |
| 5,274,560 A | 12/1993 | LaRue | |
| 5,278,532 A | 1/1994 | Hegg et al. | |
| 5,293,115 A | 3/1994 | Swanson | |
| 5,299,132 A | 3/1994 | Wortham | |
| 5,334,974 A | 8/1994 | Simms et al. | |
| 5,335,276 A | 8/1994 | Thompson et al. | |
| 5,335,743 A | 8/1994 | Gillbrand et al. | |
| 5,345,817 A | 9/1994 | Grenn et al. | |
| 5,351,041 A | 9/1994 | Ikata et al. | |
| 5,361,165 A | 11/1994 | Stringfellow et al. | |
| 5,371,510 A | 12/1994 | Miyauchi et al. | |
| 5,400,045 A | 3/1995 | Aoki | |
| 5,400,246 A | 3/1995 | Wilson et al. | |
| 5,404,443 A | 4/1995 | Hirata | |
| 5,408,686 A | 4/1995 | Mankovitz | |
| 5,414,439 A | 5/1995 | Groves et al. | |
| 5,416,318 A | 5/1995 | Hegyi | |
| 5,422,565 A | 6/1995 | Swanson | |
| 5,432,904 A | 7/1995 | Wong | |
| 5,440,428 A | 8/1995 | Hegg et al. | |
| 5,442,553 A | 8/1995 | Parrillo | |
| 5,450,321 A | 9/1995 | Crane | |
| 5,450,329 A | 9/1995 | Tanner | |
| 5,450,613 A | 9/1995 | Takahara et al. | |
| 5,475,399 A | 12/1995 | Borsuk | |
| 5,479,157 A | 12/1995 | Suman et al. | |
| 5,479,485 A | 12/1995 | Hayashi | |
| 5,483,632 A | 1/1996 | Kuwamoto et al. | |
| 5,486,840 A | 1/1996 | Borrego et al. | |
| 5,497,271 A | 3/1996 | Mulvanny et al. | |
| 5,497,339 A | 3/1996 | Bernard | |
| 5,504,482 A | 4/1996 | Schreder | |
| 5,504,622 A | 4/1996 | Oikawa et al. | |
| 5,506,595 A | 4/1996 | Fukano et al. | |
| 5,511,724 A | 4/1996 | Freiberger et al. | |
| 5,519,403 A | 5/1996 | Bickley et al. | |
| 5,519,410 A | 5/1996 | Smalanskas et al. | |
| 5,523,559 A | 6/1996 | Swanson | |
| 5,525,977 A | 6/1996 | Suman | |
| 5,528,248 A | 6/1996 | Steiner et al. | |
| 5,528,496 A | 6/1996 | Brauer et al. | |
| 5,534,888 A | 7/1996 | Lebby et al. | |
| 5,539,645 A | 7/1996 | Mandhyan et al. | |
| 5,539,869 A | 7/1996 | Spoto et al. | |
| 5,543,789 A | 8/1996 | Behr et al. | |
| 5,547,125 A | 8/1996 | Hennessee et al. | |
| 5,553,661 A | 9/1996 | Beyerlein et al. | |
| 5,555,172 A | 9/1996 | Potter | |
| 5,555,286 A | 9/1996 | Tendler | |
| 5,555,502 A | 9/1996 | Opel | |
| 5,559,520 A | 9/1996 | Barzegar et al. | |
| 5,572,204 A | 11/1996 | Timm et al. | |
| 5,572,484 A | 11/1996 | Gaus et al. | |
| 5,576,724 A | 11/1996 | Fukatsu et al. | |
| 5,579,535 A | 11/1996 | Orlen et al. | |
| 5,593,658 A | 1/1997 | Bogdanov et al. | |
| 5,596,319 A | 1/1997 | Spry | |
| 5,604,676 A | 2/1997 | Penzias | |
| 5,619,412 A | 4/1997 | Hapka | |
| 5,621,252 A | 4/1997 | Bucknam | |
| 5,625,668 A | 4/1997 | Loomis et al. | |
| 5,627,547 A | 5/1997 | Ramaswamy et al. | |
| 5,638,305 A | 6/1997 | Kobayashi et al. | |
| 5,639,305 A | 6/1997 | Brown et al. | |
| 5,648,769 A | 7/1997 | Sato et al. | |
| 5,650,929 A | 7/1997 | Potter et al. | |
| 5,653,386 A | 8/1997 | Hennessee et al. | |
| 5,654,715 A | 8/1997 | Hayashikura et al. | |
| 5,661,652 A | 8/1997 | Sprague et al. | |
| 5,666,102 A | 9/1997 | Lahiff | |
| 5,670,953 A | 9/1997 | Satoh et al. | |
| 5,671,195 A | 9/1997 | Lee | |
| 5,677,837 A | 10/1997 | Reynolds | |
| 5,684,490 A | 11/1997 | Young et al. | |
| 5,689,252 A | 11/1997 | Ayanoglu et al. | |
| 5,691,695 A | 11/1997 | Lahiff | |
| 5,699,056 A | 12/1997 | Yoshida | |
| 5,699,255 A | 12/1997 | Ellis et al. | |
| 5,702,165 A | 12/1997 | Koibuchi | |
| 5,712,640 A | 1/1998 | Andou et al. | |
| 5,732,338 A | 3/1998 | Schwob | |
| 5,732,368 A | 3/1998 | Knoll et al. | |
| 5,734,973 A | 3/1998 | Honda | |
| 5,752,754 A | 5/1998 | Amitani et al. | |
| 5,757,359 A | 5/1998 | Morimoto et al. | |
| 5,758,311 A | 5/1998 | Tsuji et al. | |
| 5,760,742 A | 6/1998 | Branch et al. | |
| 5,774,070 A | 6/1998 | Rendon | |
| 5,774,827 A | 6/1998 | Smith, Jr. et al. | |
| 5,777,394 A | 7/1998 | Arold | |
| 5,790,973 A | 8/1998 | Blaker et al. | |
| 5,790,974 A | 8/1998 | Tognazzini | |
| 5,806,018 A | 9/1998 | Smith et al. | |
| 5,864,305 A | 1/1999 | Rosenquist | |
| 5,908,464 A | 6/1999 | Kishigami et al. | |
| 5,915,405 A | 6/1999 | Soszka | |
| 5,919,239 A | 7/1999 | Fraker et al. | |
| 5,919,246 A | 7/1999 | Waizmann et al. | |
| 5,948,040 A * | 9/1999 | DeLorme et al. | 701/201 |
| 5,982,298 A | 11/1999 | Lappenbusch et al. | |

| | | | |
|---|---|---|---|
| 5,987,394 | A | 11/1999 | Takakura et al. |
| 5,999,877 | A | 12/1999 | Takahashi et al. |
| 6,006,161 | A | 12/1999 | Katou |
| 6,009,355 | A | 12/1999 | Obradovich et al. |
| 6,021,320 | A * | 2/2000 | Bickford et al. .......... 455/186.1 |
| 6,047,234 | A | 4/2000 | Cherveny et al. |
| 6,128,559 | A | 10/2000 | Saitou et al. |
| 6,131,060 | A | 10/2000 | Obradovich et al. |
| 6,133,853 | A | 10/2000 | Obradovich et al. |
| 6,148,261 | A | 11/2000 | Obradovich et al. |
| 6,175,782 | B1 | 1/2001 | Obradovich et al. |
| 6,199,076 | B1 | 3/2001 | Logan et al. |
| 6,211,784 | B1 | 4/2001 | Nishide |
| 6,240,360 | B1 | 5/2001 | Phelan |
| 6,275,231 | B1 | 8/2001 | Obradovich |
| 6,438,450 | B1 | 8/2002 | DiLorenzo |
| 6,499,027 | B1 | 12/2002 | Weinberger |

FOREIGN PATENT DOCUMENTS

| | | |
|---|---|---|
| EP | 0569243 A1 | 11/1993 |
| EP | 0 675 341 A1 | 10/1995 |
| EP | 0766811 B1 | 4/1997 |
| EP | 0771686 | 5/1997 |
| JP | 63-136828 | 6/1988 |
| JP | 10-18712 | 1/1989 |
| JP | 2-301330 | 12/1990 |
| JP | H5-77679 | 3/1993 |
| WO | WO96/00373 | 1/1996 |
| WO | WO 96/04724 | 2/1996 |
| WO | WO96/07110 | 3/1996 |
| WO | WO97/07467 | 2/1997 |
| WO | WO9713657 | 4/1997 |

OTHER PUBLICATIONS

Hansson, Hans A. et al., "Basement of Distributed Real-Time Technology and Applications", Symposium: May 15-17, 1995, pp. 220-229, The Institute of Electrical and Electronics Engineers, Inc., Chicago, IL.
Jurgen, Ronald K., "Broadcasting with Digital Audio", IEEE Spectrum, Mar. 1996, pp. 52-59.
Hoefflinger, Bernd, "An Electronic Copilot in Your Car?", IEEE Micro, Feb. 1993, pp. 7-10.
Palmquist, Ulf, "Intelligent Cruise Control and Roadside Information", IEEE Micro, Feb. 1993, pp. 20-28.
M. Krebs, "Cars That Tell You Where to Go", The New York Times, Dec. 15, 1996, Section 11, p. 1.
L. Kraar, "Knowledge Engineering", Fortune, Oct. 28, 1996, pp. 163-164.
S. Heuchert, "Eyes Forward: An Ergonomic Solution to Driver Information Overload", Society of Automobile Engineering, Sep. 1996, pp. 27-31.
D. Sedgwick, "M-B, BMW Consider Adaptive Cruise Control", Automotive News, Mar. 17, 1997, p. 6.
D. Jewett, "New ABS Provides Quicker Emergency Stop", Automotive News, Apr. 21, 1997, p. 24.
J. Treece, "New Crop of Gadgets promises Healthy, Comfy Ride", Automotive News, May 26, 1997, pp. 3 & 49.
K. Jackson, "Luxury, Versatility Highlight Students' Dream Vehicles", Automotive News, Mar. 31, 1997, p. 26D.
K. Ott, "Special Exhibit Shows Off Devices for Disabled Drivers", Automotive News, Mar. 24, 1997, p. 4.
D. Jewett, "Boss' Kettering Awards Honor GM Innovators", Automotive News, Mar. 31, 1997, p. 26H.
L. Creasy, "Young At Art", Automotive and Transportation Interiors, May 1997, pp. 24-26 & 28.
B. Stone, "Get Ready to Take a Back Seat to a Circuit Board", Newsweek, Jun. 2, 1997, p. 10.
J. Braunstein, "Airbag Technology Takes Off", Automotive & Transportation Interiors, Aug. 1996, p. 16.
I. Adcock, "No Longer Square", Automotive & Transportation Interiors, Aug. 1996, pp. 39-40.
I. Adcock, "Geneva Gems Blend Function and Design", Automotive & Transportation Interiors, May 1997, pp. 52, 54 & 55.
J. Braunstein, "Safety Gets Smarter", Automotive & Transportation Interiors, May 1997, pp. 30-32, 36, 38, 40, 41 & 44.
E. Lapham, "Buick Experiments with Hands-Free Driving", Automotive News, Apr. 21, 1997, p. 60.
E. Lapham, "It's Not Hard to Get Used to Magnets Doing the Steering", Automotive News, Apr. 21, 1997, p. 60.
"Look, Ma, No Hands!", Autoweek, Headliner, Apr. 21, 1997, p. 6.
*American Calcar Inc.* v. *BMW of North America, LLC*, "Order Construing Patent Claims", USDC, So. District, Case No. 04cv0614 DMS (LSP), filed Jun. 1, 2005 (pp. 1-2).
Claim Chart for U.S. Patent No. 6,275,231 for claims 21-26, 40-45 (11 pgs.).
"OnStar" brochure by General Motors Corp., 1997, 17 pgs.
Geosystems, Home and Corporate web pages, © 1997, 4 pgs.
Geosystems, Products and MapRoom web pages, Products & Services, © 1997, 23 pgs.
Geosystems, Corporate web pages, Corporate Backgrounder, © 1997, 14 pgs.
WorldPages web pages, © 1995, 5 pgs.
DineNet web pages, no date, 19 pgs.
AAA Map'n' Go Travel Package web pages, © 1996, 7 pgs.
Nokia 9000 Communicator web pages, Jan. 28, 1997, printed from http://www.nokia.com/com9000/allinone.html, 16 pgs.
Global Map 2000 web pages, © 1996, 6 pgs.
Demmler, "Another Car Navigation System", Automotive Engineering, Jun. 1996, p. 87, 89.
Sedgwick, "Butterfly Gives Clue to Cars of Tomorrow", Automotive News, Oct. 28, 1996, p. 43, 2 pgs.
Jewett, "Toyota Offers Navigation System as U.S. Option", Automotive News, Nov. 18, 1996, p. 16, 2 pgs.
Yamaguchi, "Honda In-Car Navigation System for the U.S.", Automotive Engineering, Jun. 1996, p. 82-84.
Noriyuki, "Just Think of It as a Big Eye in the Sky . . . Watching", Los Angeles Times, Section E, pp. 1, 8, Apr. 27, 1997, 3 pgs.
BigYellow web pages, © 1997, 6 pgs.
Maps On Us web pages, © 1984-1996, 14 pgs.
Maps On Us web pages, Search Categories, © 1984-1996, 14 pgs.
Mapquest web page, © 1996-97, 1 pg.
Advertisement, "Collision Avoidance Is Critical . . . Now It's Affordable", no date, 1 pg.
Advertisement, "Duats", no date, 1 pg.
"Trimble Demonstrates Trimconnect", Flying, Jul. 1997, p. 51.
Advertisement, MFD 5200 Multi-Function Display, no date, 1 pg.
Advertisement, "Super Road Whiz", Sep. 1997, 2 pgs.
Yoshikazu Noguchi, "Intelligent Car—History and the Future in Japan and Toyota", Toyota Motor Corporation 98C015, no date, p. 121-125.
Monet (Mobile Networks), 1997, 2 pgs.
Steve Dye with Dr. Frank Baylin, "The GPS Manual Principles and Applications", Baylin Publications, Feb. 1997, ISBN:0-917893-29-8, 23 pgs.
*American Calcar, Inc.* v. *BMW of North America, LLC*, United States District Court, Southern District of California, Civil Action No. '04 CV00614 DMS (LSP), "Complaint for Infringement of U.S. Patent Nos. 6,009,355; 6,148,261; 6,275,231; 6,282,464; 6,330,497; 6,438,465; 6,459,961; 6,529,824; 6,542,795; 6,587,758; 6,587,759; 6,703,944; Demand for Jury Trial"; filed Mar. 25, 2004, 415 pgs.
*American Calcar, Inc.* v. *BMW of North America, LLC*, United States District Court, Southern District of California, Civil Action No. '04 CV00614 DMS (LSP), "Answer and Counterclaims, Demand for Jury Trial"; filed May 28, 2004, 12 pgs.
*American Calcar, Inc.* v. *BMW of North America, LLC*, United States District Court, Southern District of California, Civil Action No. '04 CV00614 DMS (LSP), "Reply of Plaintiff to Counterclaims; Jury Trial Demanded"; filed Jul. 1, 2004, 3 pgs.
*American Calcar, Inc.* v. *BMW of North America, LLC*, Southern District of California, Civil Action No. '04 CV00614 DMS (LSP), "Case Management Conference Order Regulating Discovery and Other Pretrial Proceedings", filed Sep. 21, 2004, 5 pgs.
*American Calcar, Inc.* v. *BMW of North America, LLC*, United States District Court, Southern District of California, Civil Action No. '04

CV00614 DMS (LSP), "Stipulation Regarding Briefing Schedule for Claim Construction Hearing and Order Thereon", filed Feb. 11, 2005, 4 pgs.

*American Calcar, Inc. v. BMW of North America, LLC*, United States District Court, Southern District of California, Civil Action No. '04 CV00614 DMS (LSP), "Stipulated Protective Order; Jury Trial Demanded", filed Mar. 21, 2005, 19 pgs.

*American Calcar, Inc. v. BMW of North America, LLC*, Southern District of California, Civil Action No. '04 CV00614 DMS (LSP), "Order Regarding Claim Construction Hearing", filed Mar. 28, 2005, 2 pgs.

*American Calcar, Inc. v. BMW of North America, LLC*, United States District Court, Southern District of California, Civil Action No. '04 CV00614 DMS (LSP), "BMWNA's Opening Claim Construction Brief", filed Apr. 15, 2005, 39 pgs.

*American Calcar, Inc. v. BMW of North America, LLC*, Southern District of California, Civil Action No. '04 CV00614 DMS (LSP), "Declaration of Russell B. Hill In Support of BMWNA's Opening Claim Construction Brief", filed Apr. 15, 2005, 34 pgs.

*American Calcar, Inc. v. BMW of North America, LLC*, United States District Court, Southern District of California, Civil Action No. '04 CV00614 DMS (LSP), "Plaintiffs Opening Claim Construction Brief", filed Apr. 15, 2005, 76 pgs.

*American Calcar, Inc. v. BMW of North America, LLC*, United States District Court, Southern District of California, Civil Action No. '04 CV00614 DMS (LSP), "Joint Claim Construction Chart", filed Apr. 15, 2005, 27 pgs.

*American Calcar, Inc. v. BMW of North America, LLC*, United States District Court, Southern District of California, Civil Action No. '04 CV00614 DMS (LSP), "BMWNA's Opposition to ACI's Opening Claim Construction Brief", filed Apr. 29, 2005, 22 pgs.

*American Calcar, Inc. v. BMW of North America, LLC*, United States District Court, Southern District of California, Civil Action No. '04 CV00614 DMS (LSP), "Supplemental Declaration of Russell B. Hill In Support of BMWNA's Opposition to ACI's Opening Claim Construction Brief", filed Apr. 29, 2005, 3 pgs.

*American Calcar, Inc. v. BMW of North America, LLC*, United States District Court, Southern District of California, Civil Action No. '04 CV00614 DMS (LSP), "BMW of North America, LLC's Request and Order Re Delivery and Use of Demonstratives and Equipment at Claim Construction Hearing", filed May 2, 2005, 4 pgs.

*American Calcar, Inc. v. BMW of North America, LLC*, United States District Court, Southern District of California, Civil Action No. '04 CV00614 DMS (LSP), "Notice of Document Discrepancies", filed May 3, 2005, 1 pg.

*American Calcar, Inc. v. BMW of North America, LLC*, United States District Court, Southern District of California, Civil Action No. '04 CV00614 DMS (LSP), "Plaintiff's Opposition Brief in Response to Defendant's Opening Claim Construction Brief", filed May 3, 2005, 37 pgs.

*American Calcar, Inc. v. BMW of North America, LLC*, United States District Court, Southern District of California, Civil Action No. '04 CV00614 DMS (LSP), "Markman Hearing Minutes", May 6, 2005, 2 pgs.

*American Calcar, Inc. v. BMW of North America, LLC*, United States District Court, Southern District of California, Civil Action No. '04 CV00614 DMS (LSP), "Joint Stipulation Regarding Construction of "Communication Means" in Claim 26 of U.S. Patent No. 6,148,261", filed May 27, 2005, 3 pgs.

*American Calcar, Inc. v. BMW of North America, LLC*, United States District Court, Southern District of California, Civil Action No. '04 CV00614 DMS (LSP), "Order Construing Patent Claims", filed Jun. 1, 2005, 21 pgs.

*American Calcar, Inc. v. BMW of North America, LLC*, United States District Court, Southern District of California, Civil Action No. '04 CV00614 DMS (CAB), "BMWNA's Notice of Motion and Motion for Summary Judgment of Non-Infringement of U.S. Patent No. 6,275,231", filed Jan. 23, 2006, 2 pgs.

*American Calcar, Inc. v. BMW of North America, LLC*, United States District Court, Southern District of California, Civil Action No. '04 CV00614 DMS (CAB), "BMWNA's Memorandum of Points and Authorities in Support of Its Motion for Summary Judgment of Non-Infringement of U.S. Patent No. 6,275,231", filed Jan. 23, 2006, 23 pgs.

*American Calcar, Inc. v. BMW of North America, LLC*, United States District Court, Southern District of California, Civil Action No. '04 CV00614 DMS (LSP), "Notice of Motion and Unopposed Motion for Leave to Exceed Page Limit on Summary Judgment Motions", filed Jan. 23, 2006, 2 pgs.

*American Calcar, Inc. v. BMW of North America, LLC*, United States District Court, Southern District of California, Civil Action No. '04 CV00614 DMS (LSP), "Memorandum in Support of Unopposed Motion for Leave to Exceed Page Limit on Summary Judgment Motions", filed Jan. 23, 2006, 3 pgs.

*American Calcar, Inc. v. BMW of North America, LLC*, United States District Court, Southern District of California, Civil Action No. '04 CV00614 DMS (CAB), "Order Setting Briefing Schedule", filed Jan. 25, 2006, 1 pgs.

*American Calcar, Inc. v. BMW of North America, LLC*, United States District Court, Southern District of California, Civil Action No. '04 CV00614 DMS (CAB), "BMWNA's Compendium of Exhibits In Support of Its Motions for Summary Judgment", filed Jan. 25, 2006, 2 pgs.

*American Calcar, Inc. v. BMW of North America, LLC*, United States District Court, Southern District of California, Civil Action No. '04 CV00614 DMS (CAB), "American Calcar, Inc.'s Opposition to BMWNA's Motion for Summary Judgment of Non-Infringement of U.S. Patent No. 6,275,231", filed Feb. 15, 2006, 16 pgs.

*American Calcar, Inc. v. BMW of North America, LLC*, United States District Court, Southern District of California, Civil Action No. '04 CV00614 DMS (CAB), "Declaration of Frederick Berretta In Support of American Calcar, Inc.'s Opposition to Defendant's Motions for Summary Judgment", filed Feb. 15, 2006, 8 pgs.

*American Calcar, Inc. v. BMW of North America, LLC*, United States District Court, Southern District of California, Civil Action No. '04 CV00614 DMS (CAB), "Declaration of Michael Obradovich In Support of American Calcar, Inc.'s Oppositions to Defendant's Motions for Summary Judgment", filed Feb. 15, 2006, 4 pgs.

*American Calcar, Inc. v. BMW of North America, LLC*, United States District Court, Southern District of California, Civil Action No. '04 CV00614 DMS (CAB), "American Calcar, Inc.'s Compendium of Exhibits in Support of Its Opposition to Defendant's Motions for Summary Judgment", filed Feb. 15, 2006, 6 pgs.

*American Calcar, Inc. v. BMW of North America, LLC*, United States District Court, Southern District of California, Civil Action No. '04 CV00614 DMS (CAB), "American Calcar, Inc.'s Objections to Certain Evidence Offered by BMWNA in Support of Its Motions for Summary Judgment", filed Feb. 15, 2006, 5 pgs.

*American Calcar, Inc. v. BMW of North America, LLC*, United States District Court, Southern District of California, Civil Action No. '04 CV00614 DMS (CAB), "American Calcar, Inc.'s Compendium of Non-Confidential Exhibits in Support of Its Oppositions to Defendant's Motions for Summary Judgment", filed Feb. 16, 2006, 5 pgs.

*American Calcar, Inc. v. BMW of North America, LLC*, United States District Court, Southern District of California, Civil Action No. '04 CV00614 DMS (CAB), "American Calcar, Inc.'s Amended Ex Parte Application to File Confidential Exhibits and Briefs Under Seal", filed Feb. 17, 2006, 3 pgs.

*American Calcar, Inc. v. BMW of North America, LLC*, United States District Court, Southern District of California, Civil Action No. '04 CV00614 DMS (CAB), "Reply of Defendant and Counterclaimant, BMW of North America, LLC In Support of Its Motion for Summary Judgment of Non-Infringement of U.S. Patent No. 6,275,231", filed Feb. 23, 2006, 8 pgs.

*American Calcar, Inc. v. BMW of North America, LLC*, United States District Court, Southern District of California, Civil Action No. '04 CV00614 DMS (CAB), "Declarations of Wilfried Steins; Cindy Ryerson; Vlodek Olczak and Thomas M. Dunham Filed in Support of BMWNA's Motions for Summary Judgment", filed Feb. 23, 2006, 274 pgs.

*American Calcar, Inc. v. BMW of North America, LLC*, United States District Court, Southern District of California, Civil Action No. '04 CV00614 DMS (CAB), "Supplemental Declaration of Russell B.

Hill In Support of Defendant and Counterclaimant, BMW of North America, LLC's Motions for Summary Judgment", filed Feb. 23, 2006, 39 pgs.

*American Calcar, Inc.* v. *BMW of North America, LLC*, United States District Court, Southern District of California, Civil Action No. '04 CV00614 DMS (CAB), "American Calcar, Inc.'s Response and Objections to Newly Produced Evidence Offered by BMWNA In Support of Its Motions for Summary Judgment", filed Mar. 3, 2006, 19 pgs.

*American Calcar, Inc.* v. *BMW of North America, LLC*, United States District Court, Southern District of California, Civil Action No. '04 CV00614 DMS (CAB), "Motion Hearing Minutes", dated Mar. 10, 2006, 1 pg.

*American Calcar, Inc.* v. *BMW of North America, LLC*, United States District Court, Southern District of California, Civil Action No. '04 CV00614 DMS (CAB), "Order Granting BMW of North America's Motion for Summary Judgment of Non-Infringement of U.S. Patent No. 6,275,231", filed Mar. 29, 2006, 7 pgs.

*American Calcar, Inc.* v. *BMW of North America, LLC*, United States District Court, Southern District of California, Civil Action No. '04 CV00614 DMS (CAB), "BMWNA's Witness List", filed Apr. 3, 2006, 3 pgs.

*American Calcar, Inc.* v. *BMW of North America, LLC*, United States District Court, Southern District of California, Civil Action No. '04 CV00614 DMS (CAB), "Defendant and Counterclaimant BMW of North America LLC's Trial Exhibit List", filed Apr. 3, 2006, 68 pgs.

*American Calcar, Inc.* v. *BMW of North America, LLC*, United States District Court, Southern District of California, Civil Action No. '04 CV00614 DMS (CAB), "American Calcar, Inc.'s Ex Parte Application for Clarification Re Grant of Summary Judgment of Non-Infringement on '231 and '944 Patents and Order", filed Apr. 19, 2006, 5 pgs.

*American Calcar, Inc.* v. *BMW of North America, LLC*, United States District Court, Southern District of California, Civil Action No. '04 CV00614 DMS (CAB), "BMWNA's Response to American Calcar, Inc.'s Ex Parte Application Re Grant of Summary Judgment of Non-Infringement on '231 and '944 Patents", filed Apr. 19, 2006, 7 pgs.

*American Calcar, Inc.* v. *BMW of North America, LLC*, United States District Court, Southern District of California, Civil Action No. '04 CV00614 DMS (CAB), "Plaintiffs Letter Brief Regarding Various Discovery Issues", filed Apr. 19, 2006, 52 pgs.

*American Calcar, Inc.* v. *BMW of North America, LLC*, United States District Court, Southern District of California, Civil Action No. '04 CV00614 DMS (CAB), "Letter from Howrey Simon to the Hon. Cathy A. Bencivengo", filed Apr. 19, 2006, 21 pgs.

*American Calcar, Inc.* v. *BMW of North America, LLC*, United States District Court, Southern District of California, Civil Action No. '04 CV00614 DMS (CAB), "American Calcar, Inc.'s Witness List", filed Apr. 28, 2006, 18 pgs.

*American Calcar, Inc.* v. *BMW of North America, LLC*, United States District Court, Southern District of California, Civil Action No. '04 CV00614 DMS (CAB), American Calcar, Inc.'s Trial Exhibit List, filed Apr. 28, 2006, 14 pgs.

*American Calcar, Inc.* v. *BMW of North America, LLC*, United States District Court, Southern District of California, Civil Action No. '04 CV00614 DMS (CAB), "BMWNA's Witness List", filed Apr. 28, 2006, 4 pgs.

*American Calcar, Inc.* v. *BMW of North America, LLC*, United States District Court, Southern District of California, Civil Action No. '04 CV00614 DMS (CAB), "Defendant and Counterclaimant BMW of North America LLC's Trial Exhibit List", filed Apr. 28, 2006, 30 pgs.

*American Calcar, Inc.* v. *BMW of North America, LLC*, United States District Court, Southern District of California, Civil Action No. '04 CV00614 DMS (CAB), "BMW of North America, LLC's Ex Parte Application to File Exhibit B to Its Contentions of Fact and Law Under Seal and Order Thereon", filed May 4, 2006, 2 pgs.

*American Calcar, Inc.* v. *BMW of North America, LLC*, United States District Court, Southern District of California, Civil Action No. '04 CV00614 DMS (CAB), "Defendant BMWNA's Memorandum of Contentions of Fact and Law", filed May 4, 2006, 198 pgs.

*American Calcar, Inc.* v. *BMW of North America, LLC*, United States District Court, Southern District of California, Civil Action No. '04 CV00614 DMS (CAB), "American Calcar, Inc.'s Amended Trial Exhibit List", filed May 5, 2006, 20 pgs.

*American Calcar, Inc.* v. *BMW of North America, LLC*, United States District Court, Southern District of California, Civil Action No. '04 CV00614 DMS (CAB), "American Calcar, Inc.'s Ex Parte Application to File Memorandum of Contentions of Fact and Law Under Seal", filed May 8, 2006, 3 pgs.

*American Calcar, Inc.* v. *BMW of North America, LLC*, United States District Court, Southern District of California, Civil Action No. '04 CV00614 DMS (CAB), "Order Scheduling Settlement Disposition Conference", May 10, 2006, 2 pgs.

*American Calcar, Inc.* v. (1) *American Honda Motor Co., Inc.* and (2) *Honda of America Manufacturing, Inc.*, U.S. District Court for the Eastern District of Texas, Tyler Division, Civil Action No. 6:05cv475 (LED), "Original Complaint for Patent Infringement" (including civil cover sheet), filed Dec. 14, 2005, 11 pgs. (exhibits omitted).

*American Calcar, Inc.* v. (1) *American Honda Motor Co., Inc.* and (2) *Honda of America Manufacturing, Inc.*, U.S. District Court for the Eastern District of Texas, Tyler Division, Civil Action No. 6:05cv475 (LED), "First Amended Complaint for Patent Infringement", filed Apr. 4, 2006, 11 pgs., (exhibits omitted).

*American Calcar, Inc.* v. *American Honda Motor Co., Inc.* and *Honda of America Manufacturing, Inc.*, United States District Court, Southern District of California, Civil Action No. 06-CV-2433 DMS (LSP) (Exhibit 14, "American Honda's Preliminary Invalidity Contentions for U.S. Patent No. 6,275,231" only) dated Nov. 30, 2006 (23 pgs.).

1995 BMW Instruction Manual (translated into English), pp. 1-156 (80 pgs.).

\* cited by examiner

CENTRALIZED CONTROL AND MANAGEMENT SYSTEM FOR AUTOMOBILES

The present application is a continuation of application Ser. No. 09/923,125 filed on Aug. 6, 2001, now U.S. Pat. No. 7,043,699 which is a continuation of application Ser. No. 08/904,855 filed on Aug. 1, 1997, now U.S. Pat. No. 6,275,231, the disclosures of which are incorporated by reference herein.

STATEMENT OF RELATED APPLICATIONS

The present application is related to commonly assigned U.S. Pat. No. 6,009,355.

FIELD OF THE INVENTION

The invention relates generally to control and management systems and, more particularly, to a system for use in an automobile which facilitates the user's control and management of various vehicle functions.

BACKGROUND OF THE INVENTION

The concept of an automated highway system (AHS) has been fervently pursued. Although the interpretation of the AHS concept varies from one person to another, people implementing the concept are incorporating more and more technology into an automobile to improve its operations, better its safety measures, and add conveniences to the vehicle user.

A prevalent interpretation of the AHS concept is hands-free driving. To that end, magnets have been buried along an experimental automated highway, and automobiles have been equipped with magnetometers to sense the magnets to guide the moving vehicles, thereby obviating manual steering. In another approach, an automobile is equipped with a video system in which cameras monitor different segments of the road ahead and feed images to on-board computers that control steering, acceleration and braking of the vehicle.

Although the above hands-free driving systems are at various stages of development and will be made available to the public in years to come, a less comprehensive system known as an "adaptive cruise control system" will soon be publicly available. This system is capable of adjusting a vehicle's speed to keep it moving with the flow of traffic. Specifically, it relies on radar or infrared sensors to measure the distance to the vehicle just ahead. If the vehicle ahead speeds up or slows down, an onboard computer adjusts the throttle or brakes to maintain a safe distance.

Although the ultimate AHS is in the works, it is believed that the building blocks therefor are in place. These building blocks include the well-known "drive-by-wire" system, TRAXXAR stability control system, global positioning satellite (GPS) navigation system, etc. The drive-by-wire system refers to a throttle system responsive to electrical control signals to adjust the speed of a vehicle, and plays a major role in the aforementioned adaptive cruise control system.

In the TRAXXAR system, sensors are used to measure the steering wheel position, yaw rate and lateral acceleration of the vehicle. These sensors work with an onboard computer to controllably apply brakes at selected wheels to avoid potential skids.

In a well-known manner, the GPS navigation system receives signals from a constellation of satellites. In response to such signals, the navigation system pinpoints the vehicle's location (in latitude and longitude). It also detects the vehicle's speed and direction. With geographic information stored on an onboard computer, the navigation system is capable of verbally and visually communicating to the user instructions for reaching the destination.

SUMMARY OF THE INVENTION

Today's automobiles are commonly equipped with an anti-lock brake system (ABS), a cruise control system, a climate control system, a compact disk (CD) player, a radio receiver, an audiovisual system, a restraint system, an air bag system, a cellular communication system, a car alarm system, and so on and so forth. The users are overwhelmed and confused with a large number of knobs, switches and buttons used to control the discrete functions of the individual systems. We have recognized that as more and more systems are being incorporated into an automobile to implement the AHS concept, the management of the systems will be more unwieldy than ever.

The invention overcomes the prior art limitations by employing a master interface to manage system functions in a vehicle. In accordance with the invention, a plurality of items are exhibited on a display in the master interface. Each item represents a respective one of the systems in the vehicle. The exhibited items are arranged on the display in substantially the same relation to one another as the systems represented thereby in the vehicle. At least one of the items can be selected using an indicator device (e.g., a mouse). The system represented by the selected item can be operated to realize the functions associated therewith.

Accordingly, it is an object of the invention that the master interface for controlling the system functions is simple and well organized, as opposed to using the large number of knobs, switches and buttons to control same as in the prior art.

It is another object of the invention that the master interface centralizes the system functions so that the user can focus on a single interface while driving, rather than being distracted by the large number of knobs, switches and buttons used in the prior art, which are dispersed throughout the vehicle.

It is yet another object of the invention that the access to the system functions through the master interface is intuitive and direct so that a user who is not familiar with the vehicle can instantly learn to manage such functions.

The master interface is connected to a central processor in accordance with a system architecture wherein the central processor also connects traditionally unrelated vehicle systems together. With such an architecture, the central processor can coordinate the actions of the connected systems to realize synergistic functions such as smart driving, automatic parking, etc.

BRIEF DESCRIPTION OF THE DRAWING

Further objects, features and advantages of the invention will become apparent from the following detailed description taken in conjunction with the accompanying drawing showing an illustrative embodiment of the invention, in which:

FIG. 18 is a display screen for adjusting audio and radio facilities in the vehicle in accordance with the invention.

Throughout this disclosure, unless otherwise stated, like elements, components and sections in the figures are denoted by the same numerals.

DETAILED DESCRIPTION

The present invention is directed to a technique for effective management and control of vehicle functions in an automobile. Traditionally, an automobile incorporates a multiplicity of discrete systems such as a climate control system, an audio system, an anti-lock brake system (ABS), a cruise control system, etc. These systems are individually controlled and managed by their own user interfaces including knobs, switches, buttons, and displays. As the automobile industry is fervently pursuing the automated highway system (AHS) concept, more and more systems are being added to the automobile. As a result, the management of all these systems becomes more unwieldy than ever.

Figure 1:
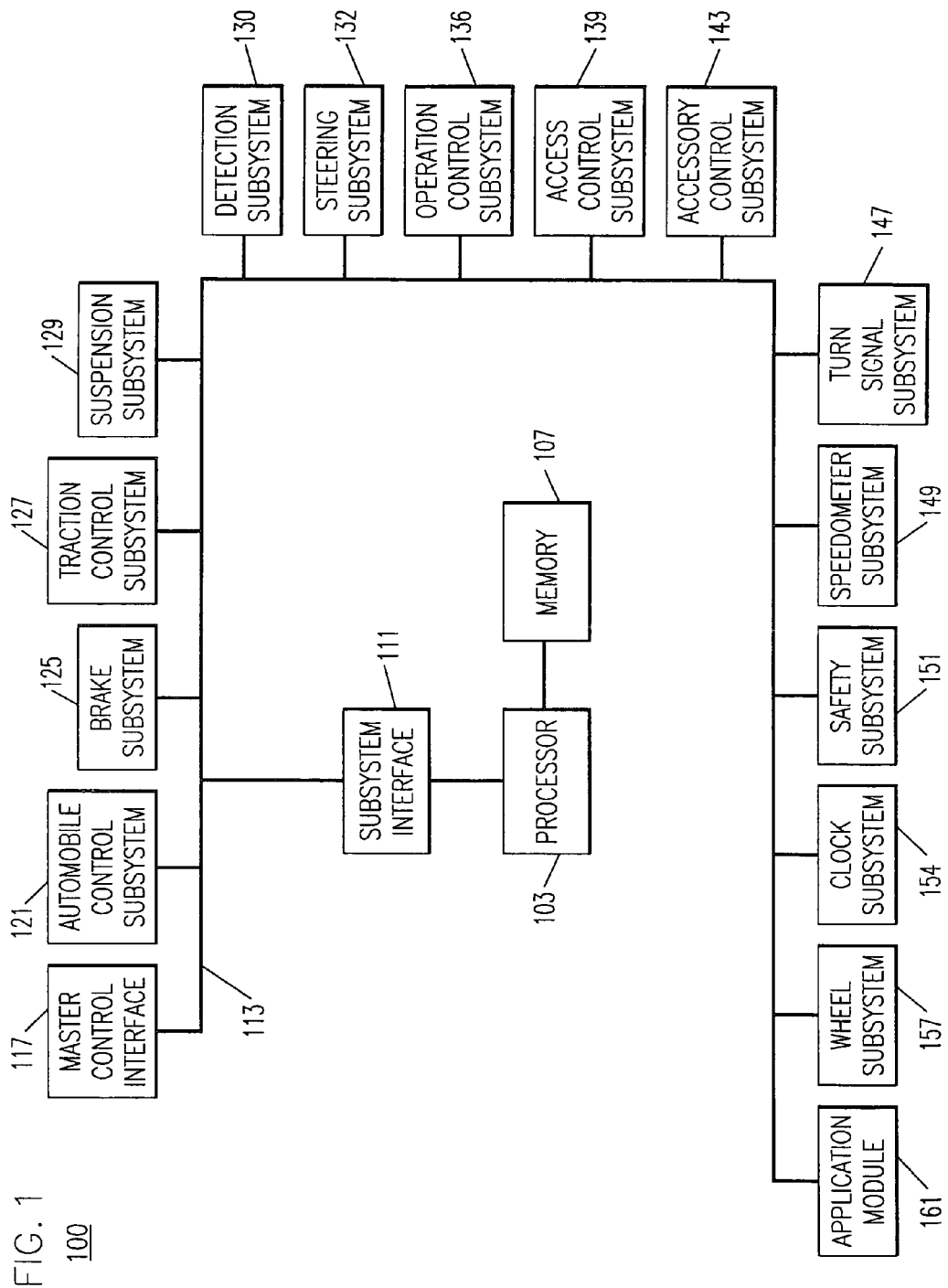
FIG. 1 is a block diagram of a control and management system for use in an automobile in accordance with the invention.

FIG. 1 illustrates control and management system 100 for use in an automobile, which embodies the principles of the invention. In accordance with the invention, system 100 places the previously unrelated automobile subsystems under centralized control, thereby coordinating their functions synergistically and allowing data sharing among the subsystems effectively. In addition, system 100 provides a user-friendly master control interface for the user to manage the subsystems in an efficient manner.

As shown in FIG. 1, central to system 100 is processor 103 of conventional design. Processor 103 is connected to non-volatile memory 107 and subsystem interface 111. The latter is an ensemble of standard inputs/outputs (I/O's) connecting processor 103 to the subsystems to be described. Processor 103 performs various tasks in system 100 according to certain routines stored in memory 107. For example, through interface 111, processor 103 collects information from the subsystems for analysis, and transmits data and control signals to the subsystems, thereby controlling the vehicle functions.

Interface 111 connects the aforementioned subsystems through common bus 113, which include master control interface 117, automobile control subsystem 121, brake subsystem 125, traction control subsystem 127, suspension subsystem 129, detection subsystem 130, steering subsystem 132, operation control subsystem 136, access control subsystem 139, accessory control subsystem 143, turn signal subsystem 147, speedometer subsystem 149, safety subsystem 151, clock subsystem 154, wheel subsystem 157 and application module 161.

Figure 2:
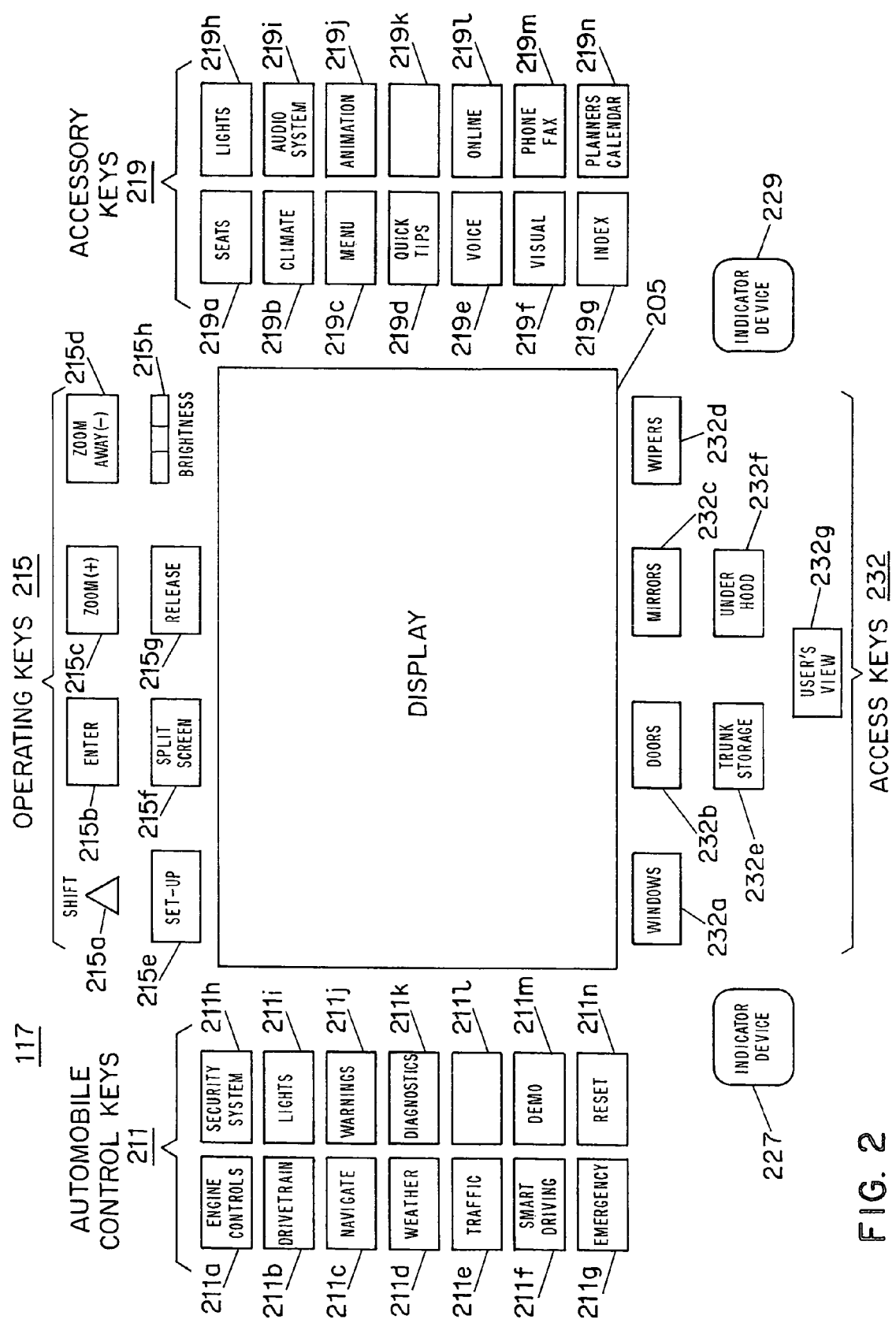
FIG. 2 illustrates a master control interface in the system of FIG. 1.

Referring also to FIG. 2, master control interface 117 in accordance with the invention affords the user centralized control and management of the vehicle functions. interface 117 includes display 205, driver control keys 211, operating keys 215, accessory keys 219, access keys 232, and indicator devices 227 and 229. When a particular key or device is depressed or operated, the corresponding signal is generated by interface 117 and interrupts processor 103 to inform the latter the depression of the key or the operation of the device.

By way of example, display 205 is a liquid crystal display (LCD) located on a dashboard of the automobile. Display 205 includes a LCD driver (not shown) for processor 103 to control the display graphics. This driver is also responsive to signals generated by indicator devices 227 and 229 to perform certain tasks to be described. In this illustrative embodiment, both devices 227 and 229 are each a mouse device which may be wireless, and can be used to point and click at displayed options on display 205 and to scroll various menus or screens. However, it will be appreciated that devices 227 and 229 may be joysticks, light pens, trackballs, touchpad, or a combination thereof, instead.

Display 205 also incorporates well-known touch-screen circuitry (not shown). With this circuitry, the user can interact with processor 103 by, say, touching a displayed option on display 205. Through interface 117, processor 103 receives from the touch screen circuitry a signal identifying the location on display 205 where it has been touched. If such a location matches the predetermined location of one of the displayed options, processor 103 determines that the option has been selected. With such touch-screen and displayed option selection capabilities, the user is able to obtain information on and control selectable functions of the automobile.

Automobile control keys 211 relate to the functions provided by automobile control subsystem 121. Subsystem 121 monitors many aspects of the vehicle operation including the exhaust temperature, fuel flow, engine temperature, ignition timing, individual cylinder operations, heat exchange, etc.

When ENGINE CONTROLS key 211a is depressed, processor 103 is prompted to collect information from, among others, engine control system 319 (in FIG. 3) within subsystem 121. Processor 103 thereafter causes the screen of FIG. 4 to be displayed on display 205. FIG. 4 illustratively includes "ENGINE RESOURCES", "ENGINE CAPABILITIES", "ENGINE SYSTEMS", and "ENGINE LOADS" categories relating to the engine controls of the vehicle. Under each category, the user may use indicator device 227 or 229 to point and click at various engine related options to select same. Alternatively, utilizing the touch-screen capability, the user may touch the options on the screen with his/her finger to achieve the selection. The selected options are highlighted in a first color, and the readings and/or statuses corresponding thereto are shown in the respective blanks following the items.

For example, when OIL LEVEL option 371 is selected, the amount of oil in the engine is indicated, i.e., whether the current level of engine oil is high, medium or low. By selecting PERFORMANCE MODES option 373, the user learns whether the engine is in an aggressive mode or a fuel economy mode. The aggressive mode offers a high power output and should be used when sudden accelerations and decelerations (e.g., passing other vehicles) are anticipated. Otherwise, the fuel economy mode is recommended. When one of the two modes is indicated on line 375, the line is highlighted in a second color, indicating that another performance mode option is available for selection. In this instance, when the user points and clicks at line 375, the other performance mode option is displayed. The user may then point and click at such other option to change the performance mode.

In accordance with an aspect of the invention, subscreen 377 is used to graphically depict the engine compartment of the vehicle. By way of example, displayed items 381 through 389 in subscreen 377 depict the radiator, battery, fuse box, air cleaner, brake fluid reservoir, transmission fluid reservoir, windshield washer reservoir, oil compartment and engine block in the engine compartment, respectively. It should be pointed out that the relative positions of these displayed items correspond to those of the depicted components in the actual engine compartment. Knowing the relative positions of the components under the hood of the vehicle, the user can easily identify and point and click at selected items to quickly access information concerning the corresponding components. For example, when displayed item 381 depicting the radiator is selected, options 391 and 392 relating to the radiator are highlighted, and the readings of the current coolant temperature and coolant level are shown in the respective blanks. When displayed item 388 depicting the oil compartment is selected, options 393, 371 and 394 relating to the oil compartment are highlighted, and the readings of the current oil pressure, oil level and oil temperature are shown in the respective blanks.

Figure 3:
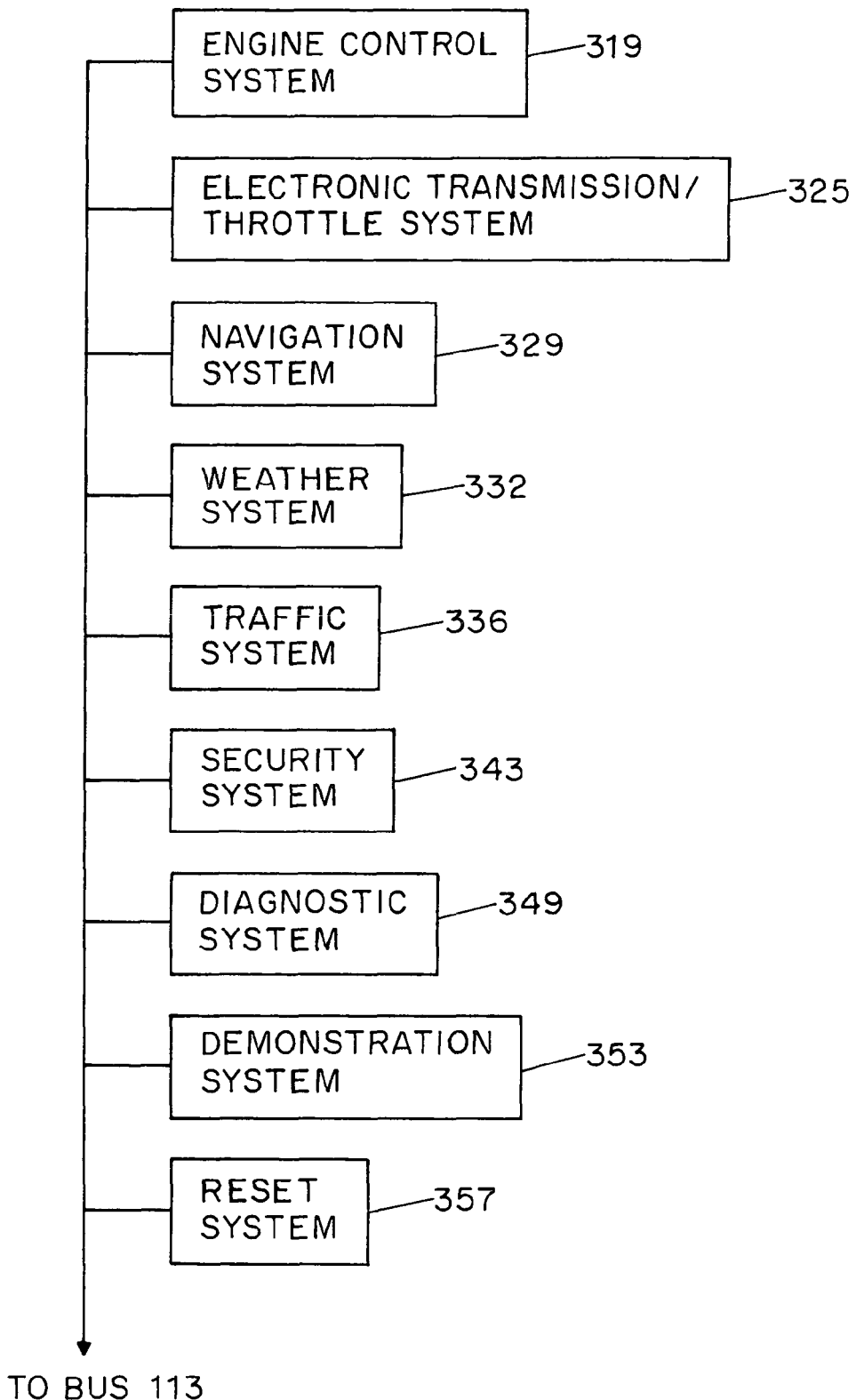
FIG. 3 illustrates an automobile control subsystem in the system of FIG. 1.
Figure 4:
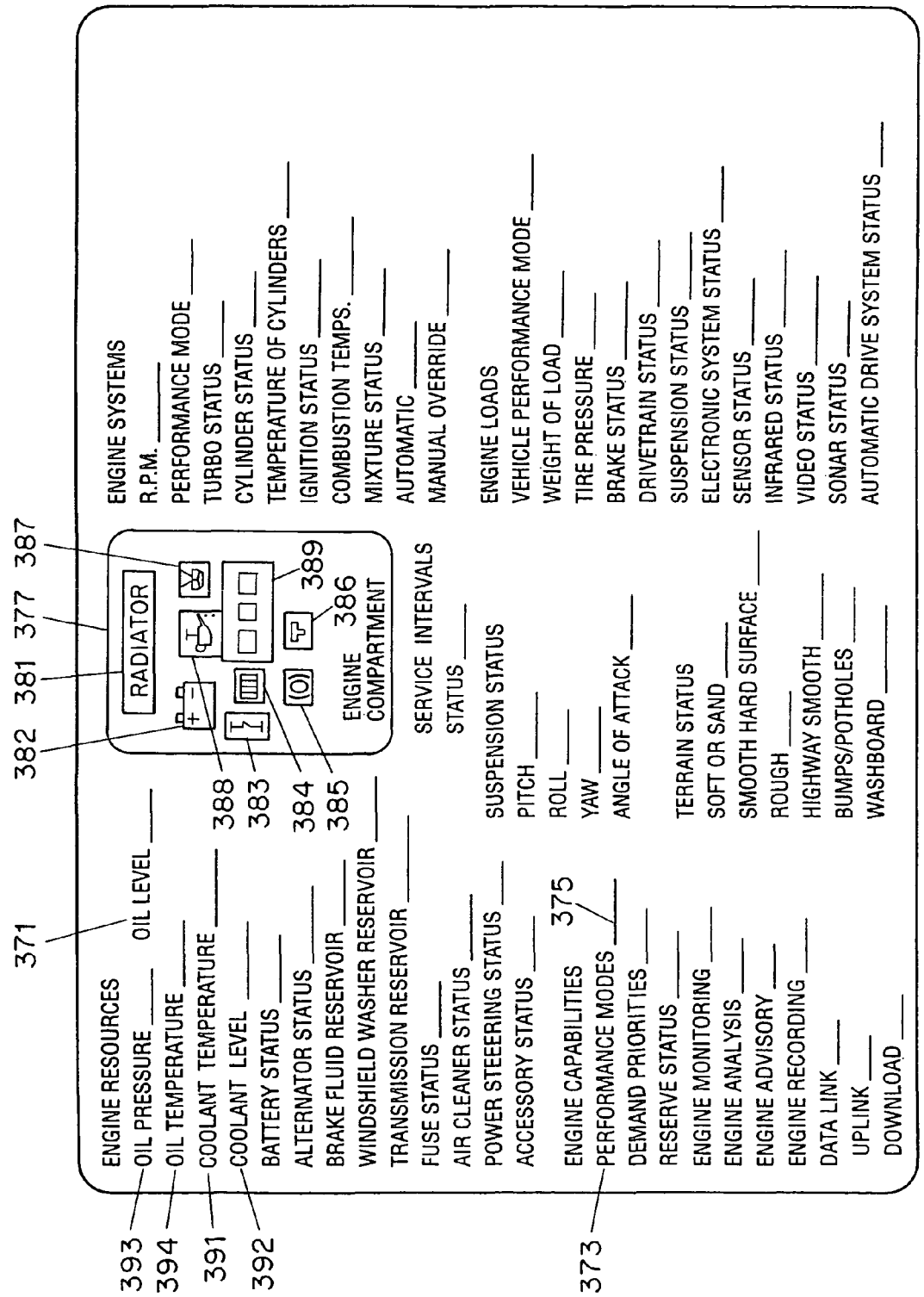
FIG. 4 illustrates a screen containing engine related options appearing on a display in the interface of FIG. 2.

As shown in FIG. 3, subsystem 121 also includes electronic transmission/throttle system 325, which operates under the control of processor 103 in accordance with certain drivetrain routines. The program instructions defining these routines are stored in memory 107 in this instance. Alternatively, they may be stored in a memory (not shown) in subsystem 121.

Figure 5:
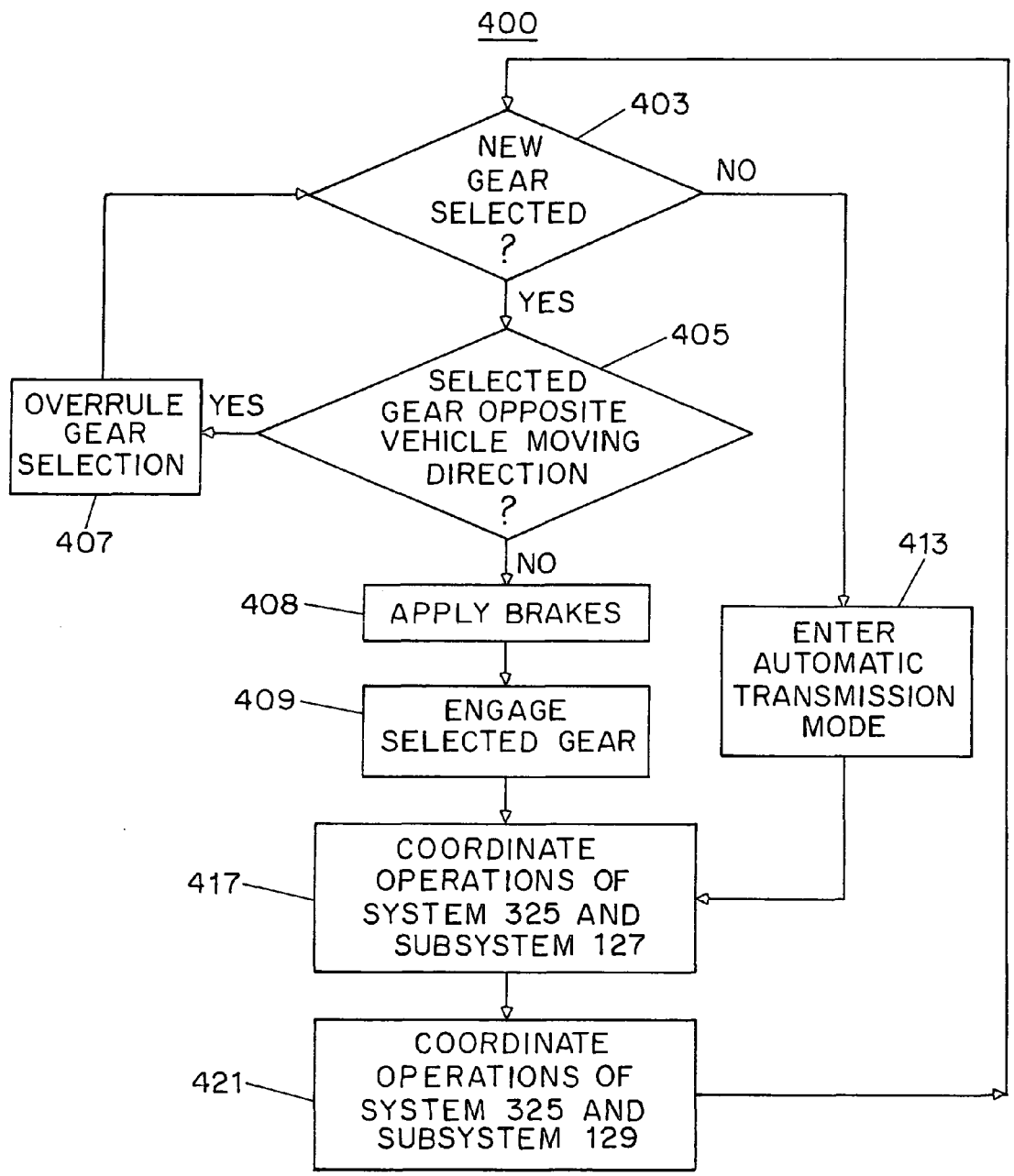
FIG. 5 is a flow chart depicting the steps of a drivetrain routine in the system of FIG. 1.

Instructed by one of the drivetrain routines, which is denoted 400 in FIG. 5, processor 103 detects whether the user has selected a transmission gear different from the currently engaged gear, as indicated at step 403. The gear selection is achieved by depressing DRIVETRAIN key 211*b*, followed by operating indicator device 227 or 229. For example, after depressing key 211*b* and moving device 227 forward (backward) causes processor 103 to initiate a signal to system 325 to select a forward (reverse) gear.

If the user has selected a different gear at step 403, routine 400 proceeds to step 405 where processor 103 determines whether the selected gear is opposite the automobile's moving direction. If the selected gear is a reverse (forward) gear, and the automobile is moving forward (backward), processor 103 overrules the user's selection, as indicated at step 407. Routine 400 then returns to step 403. Otherwise if the selected gear and the moving automobile direction are both forward or reverse, routine 400 proceeds to step 408 where processor 103 causes brake subsystem 125 to apply the brakes of the vehicle, and thereafter to step 409 where it causes system 325 to engage the selected gear. Routine 400 proceeds from step 409 to step 417 to be described.

If at step 403 processor 103 does not detect any gear change by the user, it causes system 325 to enter an automatic transmission mode in which system 325 automatically shifts the gears in a well-known manner, as indicated at step 413. Routine 400 then proceeds to step 417 where processor 103 coordinates the operation of system 325 with that of traction control subsystem 127, which may be of the type of the TRAXXAR stability control system, to prevent skids. At step 421, processor 103 coordinates the operation of system 325 with that of suspension subsystem 129 including shock absorbers to afford a smooth, comfortable and safe ride. From step 421, routine 400 returns to step 403 described above.

Another drivetrain routine causes system 325 to perform gear shifting in cooperation with other subsystems such as detection subsystem 130 and brake subsystem 125 to handle certain road conditions. Detection subsystem 130 includes radar, sonar, infrared sensors, Doppler radar, magnetometers and/or other object finder mechanisms, and is used for, among other things, monitoring the road condition ahead. For example, when an upcoming curve is detected, system 325 handles the transmission accordingly while the brakes are controllably applied by brake subsystem 125 to avoid any skid.

It should be noted at this point that suspension subsystem 129 also includes a height actuator, whereby processor 103 can controllably adjust the height of the vehicle. Thus, continuing the above example, when detection system 130 detects the upcoming curve, processor 103 may also cause the vehicle height to be lowered to increase its stability. In another instance, when detection system 103 detects a raised road surface ahead, processor 103 causes the height of the vehicle to be increased to clear the elevation, thus avoiding scraping the bottom of the vehicle.

Navigation system 329 in FIG. 3 provides onboard and/or on-line navigation capability. In a well-known manner, system 329 receives signals from a constellation of satellites which is part of the global positioning system (GPS). In response to these signals, system 329 pinpoints the automobile's location in latitude and longitude. In addition, system 329 receives the vehicle directional and speed information from a compass subsystem (not shown) and an accelerometer (not shown), respectively.

Specifically, the user depresses NAVIGATE key 211*c* to request instructions for a given destination from navigation system 329. When the depression of key 211*c* is detected by processor 103, the user is elicited for information concerning the destination, any intermediate stops, etc. Such elicitation is realized by posing questions on display 205 and/or by uttering those questions using a synthesized voice through an audio output. The user then provides verbal responses thereto through an audio input. Relying on standard speech recognition circuitry in system 100, navigation system 329 recognizes and registers the responses. Using stored map information, system 329 then provides on display 205 a suggested route leading to the destination. Furthermore, based on the knowledge of the vehicle's instantaneous speeds and directions, system 329 is capable of verbally and visually directing the user to the destination.

Because of the limited capacity of the storage for the map information or because the map information needs to be updated from time to time, it will be appreciated that system 329 would instead obtain the necessary, latest map information from an on-line service through a cellular or wireless connection.

In addition to directing the user to a given destination, system 329 through processor 103 cooperates with weather system 332 and traffic system 336 to be described. In accordance with an aspect of the invention, systems 332 and 336 jointly provide on display 205 updates regarding traffic congestions, weather conditions, hazards, highway warnings along the route suggested by system 329.

Figure 6:
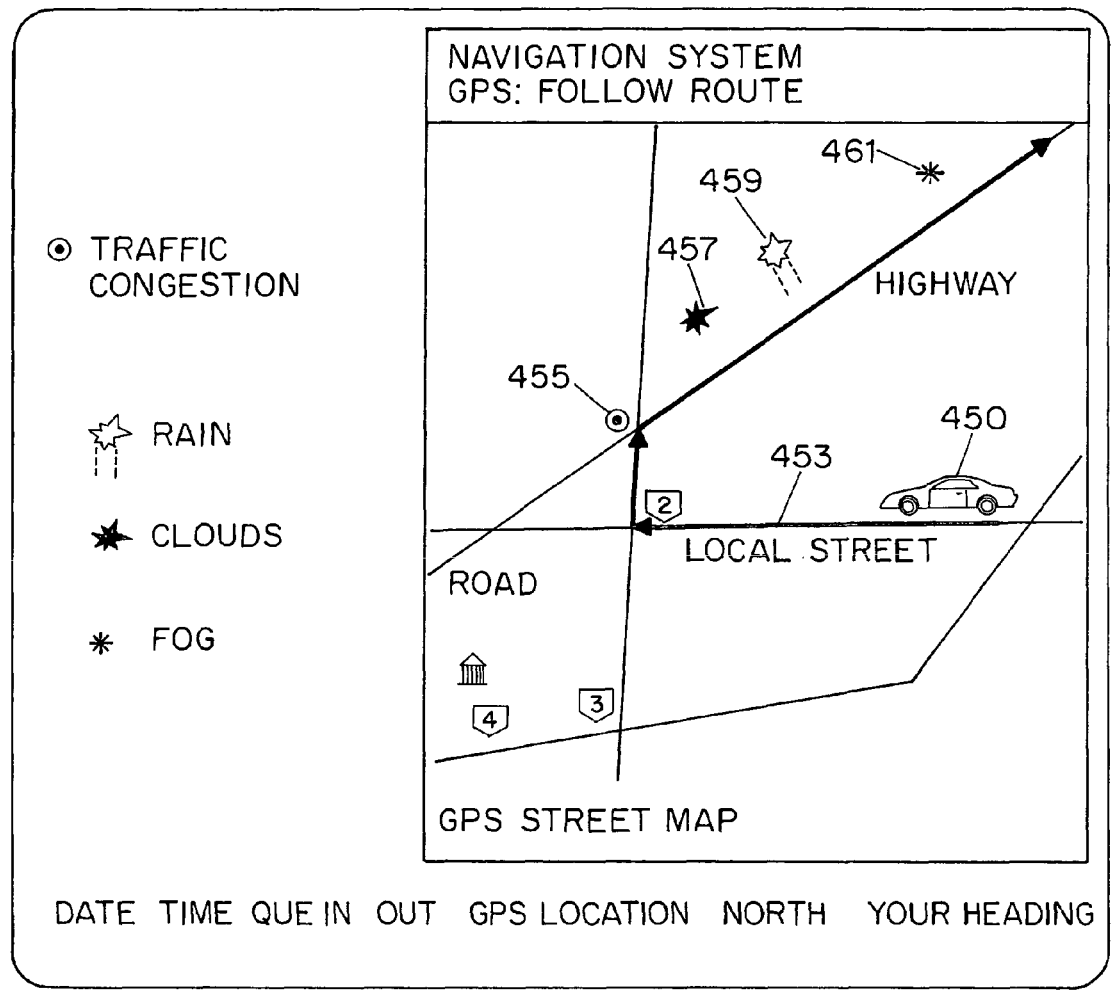
FIG. 6 illustrates a navigation screen on the display including weather and traffic indicators in accordance with the invention.

FIG. 6 illustrates one such navigation screen on display 205. On this screen, indicator 450 marks the current position of the vehicle. The suggested route (shown in boldface) by navigation system 329 is numerically denoted 453. Traffic indicator 455 is provided by system 336 to indicate where traffic congestion is on route 453. Similarly, weather indicators 457, 459 and 461 are provided by system 332 to indicate the cloudy, rainy and foggy conditions, respectively, at different points along route 453. It will be appreciated that these traffic and weather indicators may be colored and/or flashing to attract the user's attention.

Weather system 332 derives weather conditions from computer files obtained from an on-line service through a cellular or wireless connection. In an alternative embodiment, system 332 may include such well-known avionics as weather radar and lightning strike finders to detect weather conditions. By depressing WEATHER key 211*d*, the user is provided on display 205 with a map centered at a reference point indicative of the vehicle location. As to be described, system 100 runs a windows based operating system. With such an operating system, the user may operate indicator device 227 or 229 to point and click at a selected point on the map, and drag same to create a window surrounding a desired location, which may or may not include the vehicle location. Processor 103 causes system 332 to retrieve the relevant computer weather files, and derives therefrom the weather information regarding the area defined by the window.

Figure 7:
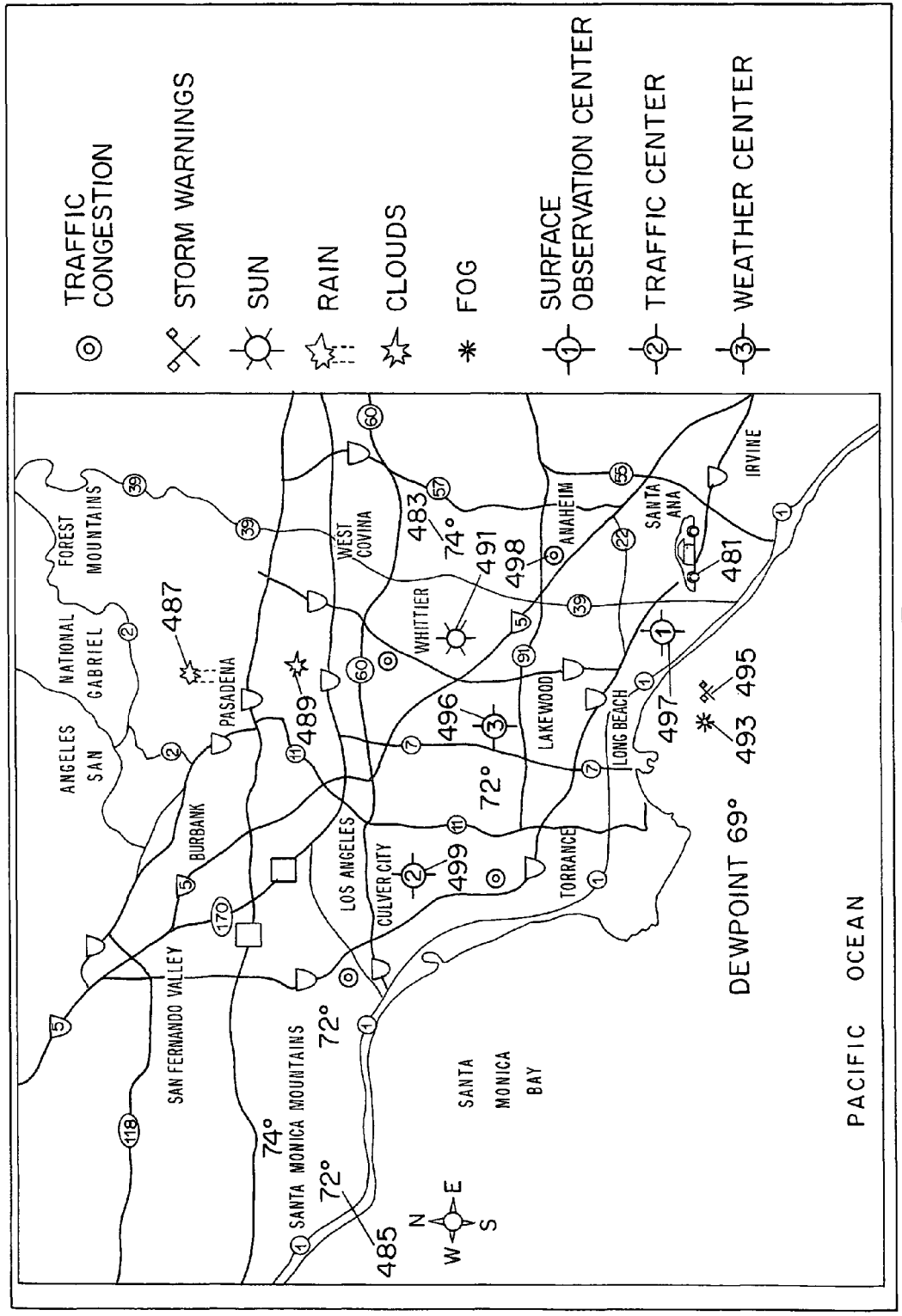
FIG. 7 illustrates another screen on the display including weather and traffic information in accordance with the invention.

FIG. 7 illustrates one such window which is created on display 205 and which surrounds the Los Angeles area. In this instance, the vehicle location is numerically denoted 481. As shown in FIG. 7, temperatures (denoted 483 and 485 for example) are indicated in parts of the subject area corresponding thereto. In addition, among others, weather indicators 487, 489, 491, 493 and 495 respectively indicate the rainy, cloudy, sunny and foggy conditions and storm warnings in the corresponding parts of the area. Moreover, weather center 496 and surface observation center 497 are indicated. The user may point and click at the respective centers to obtain the corresponding reports on weather and surface observation of the local area. These reports are generated on display 205 in text and/or read to the user through the audio output of system 100.

By default, system 332 provides the current weather information on display 205. Otherwise if the user specifies a time, system 332 provides the user with a weather forecast if the specified time is in the future, and weather history if it is in the past. With such future, current and/or past, short and/or long range weather information, the user can effectively plan his/her trip, and avoid unfavorable weather conditions.

Using the weather information from system 332, processor 103 issues on display 205 travel advisories such as requesting the user to check tire pressures after a drastic temperature change. In addition, processor 103 may cause a release of heat to warm the car battery to boost its starting power in cold weather, cause additional venting of engine heat in hot weather, and ensure closing of windows and doors in inclement weather.

It will be appreciated that weather system 332 may also be capable of obtaining weather information from such systems as the United States satellite systems, Delta radar, local area radar, etc. In addition, system 332 may be capable of gathering further information including United States current surface maps, wind chill maps, jet stream maps, winter travel hazards, forecast highs/lows, tropical weather, surface wind maps, grain and farm weather maps, etc.

Traffic system 336 will now be described. Similar to weather system 332, system 336 is capable of obtaining computerized traffic information from an on-line service through a cellular or wireless connection. In an alternative embodiment, system 336 may include such well-known electronics as a line-of-sight radar, forward infrared radar, and/or Doppler radar, each with terrain following capabilities, to sense surrounding traffic conditions.

By depressing TRAFFIC key 211*e*, the user is similarly provided on display 205 with a map centered at a reference point indicative of the vehicle location. The user may then operate indicator device 227 or 229 to point and click at a selected point on the map, and drag same to create a window surrounding a desired location, which may or may not include the vehicle location. In response, processor 103 causes traffic system 336 to obtain the relevant traffic information regarding the area defined by the window. In accordance with another aspect of the invention, the traffic information may be overlaid on an existing window (e.g., a window previously created for obtaining weather information) by pressing TRAFFIC key 211*e*.

Referring again to FIG. 7, the illustrative weather window includes overlaid traffic information in this instance. For example, traffic indicator 498 indicates traffic congestion near "Anaheim" inside the window. In addition, by pointing and clicking at traffic center 499, the user may obtain a traffic report in text and/or voice concerning the local traffic. After learning the traffic situations in the area of interest, the user can effectively plan his/her route to avoid potential traffic congestion or hazards.

In addition, traffic system 211*e* is capable of storing and recalling traffic maps and sending same to third parties using a cellular or wireless connection.

The aforementioned detection subsystem 130 also helps provide an adaptive cruise control capability. Specifically, subsystem 130 measures the distance to the vehicle just ahead. With electronic transmission/throttle system 325 and brake subsystem 125, processor 103 adjusts the vehicle's speed to keep it moving with the traffic flow. If the vehicle ahead speeds up or slows down, subsystem 130 signals processor 103 to accordingly adjust the throttle or brakes to maintain a safe distance.

When SMART DRIVING key 211*f* is depressed, processor 103 causes a menu to be displayed on display 205. This menu includes selectable items such as automatic driving and automatic parking. If automatic driving is selected, upon detecting by detection subsystem 130 an automated highway, processor 103 graphically depicts on display 205 the highway segment. Illustratively, processor 103 causes the screen of FIG. 8 to be displayed.

Figure 8:
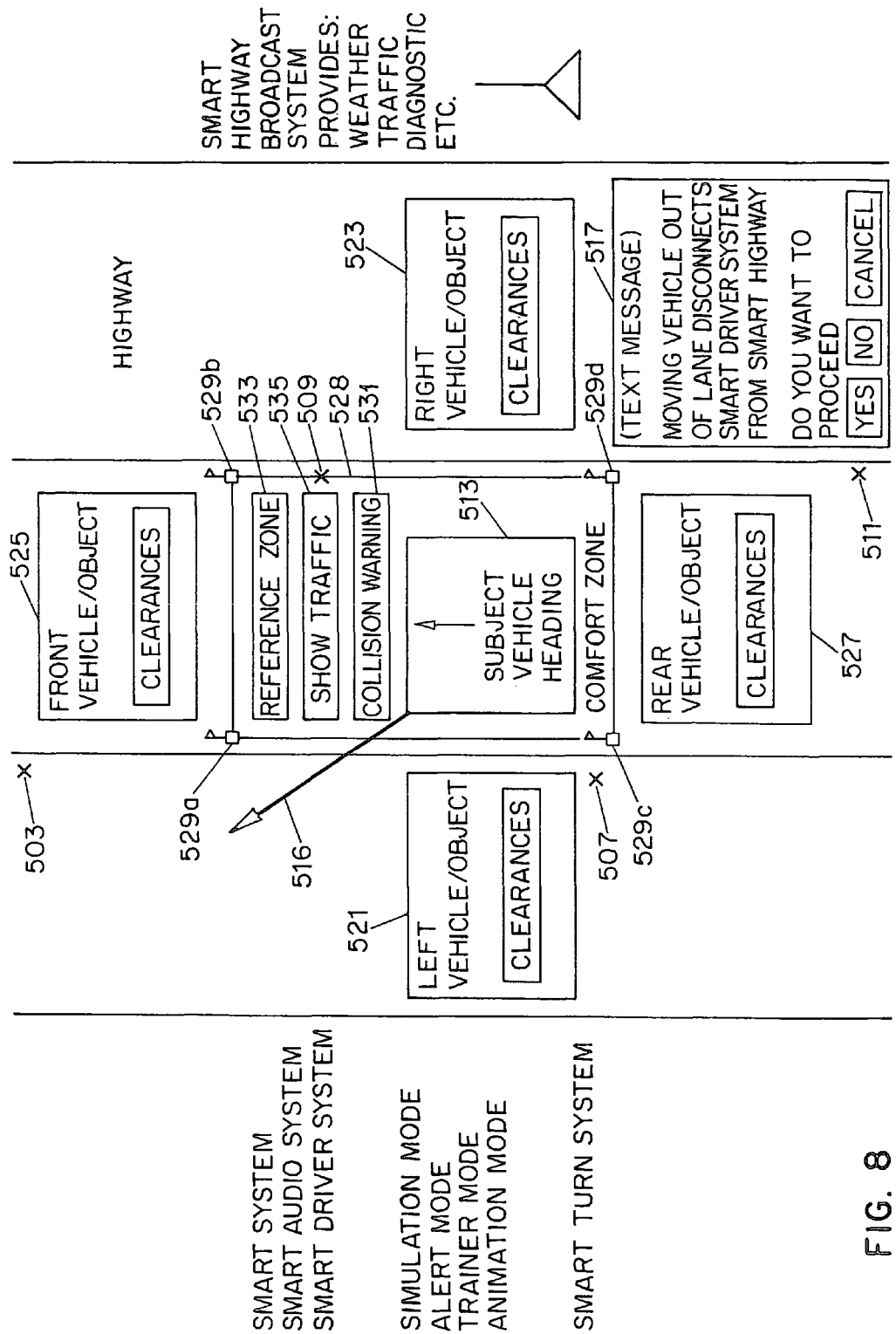
FIG. 8 illustrates yet another screen on the display for automatic driving in accordance with the invention.

In FIG. 8, indicators 503, 507, 509 and 511 demarcate the highway lane incorporating AHS technology which the subject vehicle (denoted 513) is in. In this instance, these indicators mark the locations of magnets buried in the AHS highway lane, which are detected by the magnetometer in subsystem 130. Steering subsystem 132 relies on the detection of the magnets which are separated in predetermined intervals on both sides of the lane to properly steer subject vehicle 513, thereby realizing automatic driving. In accordance with an aspect of the invention, processor 103 keeps track of the occurrences of the magnets in the AHS highway lane. If for any reason the magnets are missing or undetected for a predetermined number of intervals in a row, which may adversely affect the proper steering of the vehicle, processor 103 causes a warning to come on the display. If the user in response to such a warning redirects arrow 516 which is aligned with the AHS lane to point toward, say, the left lane, which is a non-AHS lane, processor 103 is interrupted to terminate the automatic driving. A textual message 517 immediately comes on to confirm the termination of the automatic driving. With such a confirmation, processor 103, among other things, causes turn signal subsystem 147 to be described to activate the left turn signal. The user may then manually steer the vehicle into the left lane.

In accordance with another aspect of the invention, the user may define comfort zone 528 surrounding subject vehicle 513, in which any of left vehicle/object 521, right vehicle/object 523, front vehicle/object 525, and rear vehicle/object 527 is not allowed. Comfort zone 528 may be realized by using indicator device 227 or 229 to point at indicators 529a, 529b, 529c and 529d individually, and dragging same away from subject vehicle 513. Alternatively, the user may select CLEARANCE options appearing in the respective boxes representing the vehicles/objects to define the comfort zone. The selection of one such option is followed by a prompt for the desired minimum distance from the corresponding vehicle/object, if any.

Processor 103 is programmed to control the steering, throttle and brakes of the vehicle in an attempt to keep any surrounding vehicles/objects outside comfort zone 528. If any such vehicle/object unavoidably comes within zone 528, processor 103 would issue on display 205 a warning of the zone violation, provided that COMFORT ZONE warning option 531 has been selected. A reference zone is defined by the vehicle manufacturer to be the minimal space surrounding the subject vehicle to avoid collisions with a good confidence, taking into account the instantaneous speed of the subject vehicle relative to the surrounding vehicles/objects. By design, comfort zone 520 cannot be made smaller than the reference zone. Selection of REFERENCE ZONE option 533 enables the user to set comfort zone 520 to be the same as the reference zone. In any event, no matter how large comfort zone 520 is, any vehicle/object coming within the reference zone automatically causes issuance of a collision alarm. In response to such an alarm, the user takes emergency measures to avoid any collision.

Subsystem 130 in this instance detects not only the vehicle/object ahead as in the adaptive cruise control case, but also any other surrounding vehicles/objects. Subsystem 130 periodically communicates to processor 103 data concerning the speeds and the coordinates of any surrounding vehicles/objects, relative to the subject vehicle, to realize the above comfort zone and reference zone protections. If the user selects SHOW TRAFFIC option 535, processor 103 causes display 205 to show the current positions of any actual surrounding vehicles/objects, relative to the subject vehicle. With such visual information, the user is fully aware of his/her driving environment, thus improving the user's safety especially in night driving.

Figure 9:
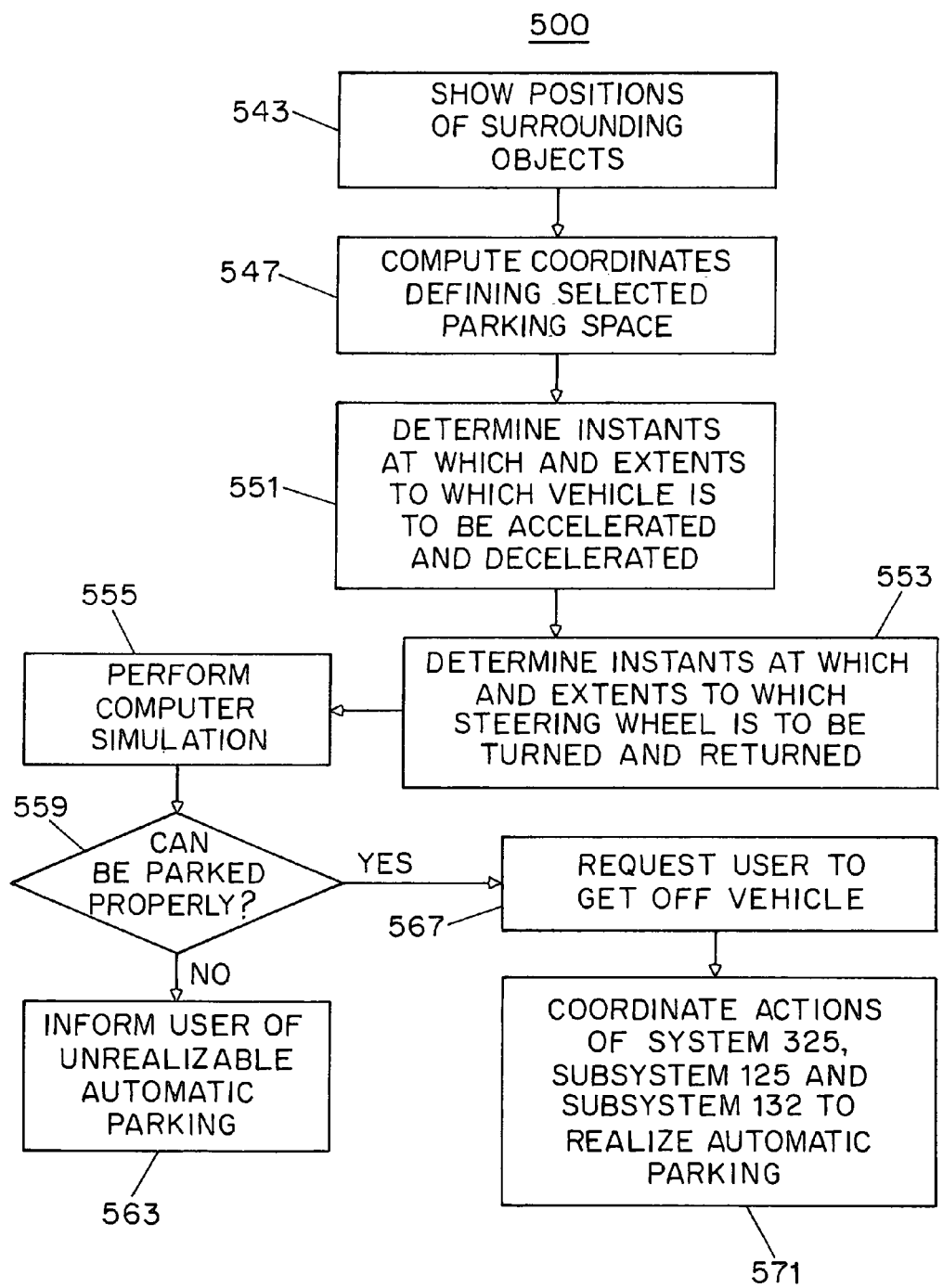
FIG. 9 is a flow chart depicting the steps of an automatic parking routine in accordance with the invention.

As mentioned before, the user can also select automatic parking of the vehicle from the above menu invoked by depression of SMART DRIVING key 211f. If the automatic parking option is selected, after the vehicle comes to a complete stop, automatic parking routine 500 stored in memory 107 is invoked. When instructed by this routine, which is depicted in FIG. 9, processor 103 causes display 205 to show thereon the positions of the surrounding objects relative to the subject vehicle, as indicated at step 543.

At this point, the user may touch the screen of display 205 to define a parking space into which the vehicle is to be parked. In order to carry out parallel parking effectively, this parking space needs to be reasonably suitable for the vehicle to be maneuvered into. Processor 103 at step 547 computes the coordinates defining the selected parking space. Knowing the respective coordinates of the subject vehicle, the surrounding objects and the parking space, processor 103 at step 551 determines the instants at which and extents to which the vehicle is to be accelerated and decelerated in the course of the parking, and at step 553 the instants at which and extents to which the steering wheel is to be turned and returned. At step 555, processor 103 causes a computer simulation to be performed using the speed and steering parameters just determined to verify that the automatic parking is feasible, without running into any surrounding objects. At that point, the user may depress ANIMATION key 219j to view on display 205 the simulation in which the subject vehicle moves into the user defined parking space in an animated fashion. At step 559 processor 103 determines whether the vehicle can be properly parked under the above conditions. If processor 103 determines that the automatic parking is unrealizable, processor 103 informs the user of same, as indicated at step 563. In response, the user needs to select another parking space or may attempt to park the vehicle manually.

Otherwise if processor 103 determines that the automatic parking is realizable, processor 103 sends an audio and video message to request the user to get off the vehicle before the automatic parking is engaged, as indicated at step 567. In the preferred embodiment, the user is provided with a transmitter (e.g., transmitter 700 to be described) for remotely signaling to processor 103 to carry out the actual parking after the user leaves the vehicle. When it is so signaled, processor 103 at step 571 coordinates the actions of electronic transmission/throttle system 325, brake subsystem 125 and steering subsystem 132 to realize the automatic parking according to the devised scheme. During the automatic parking, for any reason, the user may also use the aforementioned transmitter to signal processor 103 to abort the parking. In addition, processor 103 may cause a predetermined audible signal to be emitted to alert surrounding people while the vehicle is being parked.

In addition, the automatic parking may also be achievable by training the vehicle. For example, let's say the user often parks his/her vehicle in a particular garage. In that case, processor 103 may be set in a training mode in which as the user maneuvers and moves the vehicle from a predetermined location outside the garage to a designated parking space in the garage, processor 103 registers the coordinated operations by the user of the systems involved. Thus, with the training, each time when the vehicle is placed at the predetermined location and put in an automatic parking mode, processor 103 repeats the system operations, as registered, and accordingly parks the vehicle in the designated parking space.

Conversely, processor 103 can be programmed to perform the inverse function to the above automatic parking, i.e., to direct the vehicle out of a parking space.

When emergency key 211g is depressed, processor 103 causes emergency options to be displayed on display 205. These options may include police-type emergencies, medical emergencies, mechanical problems, panic measures, etc. For example, upon selection of the police-type emergencies option, the user may be queried whether he/she is a victim. If the user responds affirmatively, processor 103 immediately establishes a phone or modem connection with a police authority to automatically furnish such preliminary information as the identity of the user, description of the vehicle and emergency contacts, which are pre-recorded, along with the current location of the vehicle identified by navigation system 329. If possible, the user may also add, in the communication, the nature of the emergency and current statuses of the user and any passengers. By automatically communicating at least the preliminary information to the proper authority in case of an emergency, the user can be instantly reached and helped.

System 100 also includes a panic alarm, audiovisual recording facilities to audio- and video-tape potential crime scenes for later review when the user selects the panic measures option. In addition, system 100 may include broadcasting capabilities to disseminate alarm signals (e.g., a car fire alarm) via citizen's band (CB) for example.

Security system 343 in FIG. 3 works closely with access control subsystem 139 to afford controlled access to the vehicle's doors, windows, trunk, hood, accessories, system software, etc. In this illustrative embodiment, the holder of a master key to security system 343, who is mostly likely the vehicle owner, is able to assign security levels and/or access codes to other authorized users to implement the controlled access. This master key may be in the form of a special code initially provided by the vehicle manufacturer.

For example, using system 343, the master key holder assigns to each authorized user a respective personal identification number (PIN), along with a clearance level. When a person attempts to, say, adjust an accessory, which is pre-assigned with a selected security level, processor 103 elicits from the user his/her PIN through display 205 or a similar interface. In response, the person may enter a PIN by touching the appropriate keys on a displayed keypad. Upon receiving the PIN entry, processor 103 checks with system 343 whether the PIN is valid. Verification of the PIN ensures that the person is an authorized user. If the PIN is valid, processor 103 then compares the clearance level associated with the PIN with the security level of the accessory in question. Only when the clearance level is higher than the security level, would the authorized user be allowed to adjust the accessory.

The above security measures may also be used to arm and unarm anti-theft capabilities in the vehicle, which may be based on infrared, sonar or other similar surveillance technology. In addition, selected individual items in the vehicle are digitally encoded so that they would not be functional if someone removes and attempts to re-install them without proper codes.

Figure 10:
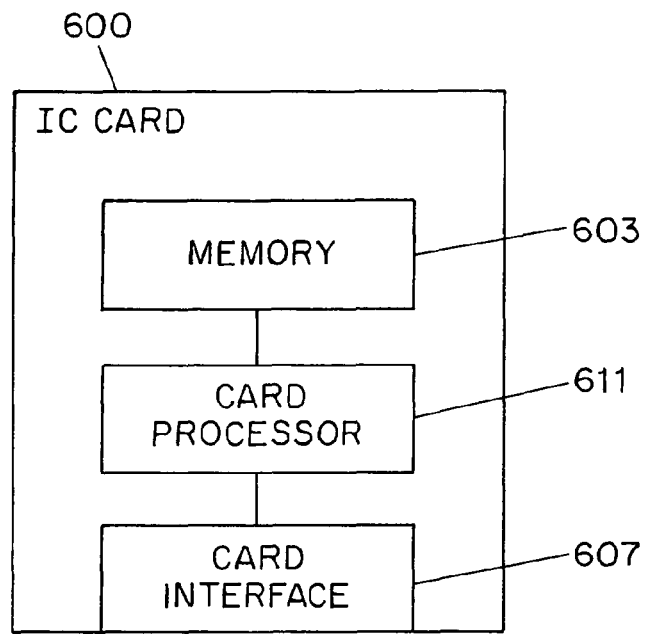
FIG. 10 is a block diagram of an integrated circuit (IC) card for gaining access to a vehicle in accordance with the invention.

Moreover, in this illustrative embodiment, security system 343 includes a receiver for receiving an RF signal containing security and personal preference data. Before gaining access to the subject vehicle, a user needs to furnish at least the security data for verification. If the security data is valid, processor 103 causes system 343 to unlock the doors and unarm the anti-theft capabilities of the vehicle. To that end, each authorized user is provided with an access card (analogous to a driver's permit) in the form of a standard integrated circuit (IC) card (also known as a "Smart Card"). FIG. 10 illustrates one such IC card, denoted 600. Security data including a user PIN and control information is stored in memory 603 in card 600. This security data may be encrypted in accordance with a well-known encryption algorithm such as an RSA or a digital encryption standard (DES) algorithm.

The aforementioned control information includes an access code indicative of the extent to which a user is allowed to control the vehicle functions and/or access its hardware and software. Depending on the access code, the user may be accorded full operating privilege, or one of the more restricted operating privileges respectively designed for family members, mechanics, police officers, etc.

In addition to the aforementioned security data, personal preference data may also be stored in memory 603. The personal preference data contains information regarding the user preferred settings of the doors, locks, windows, engine, performance profiles, climate control, audio system and other vehicle functions.

Figure 11:
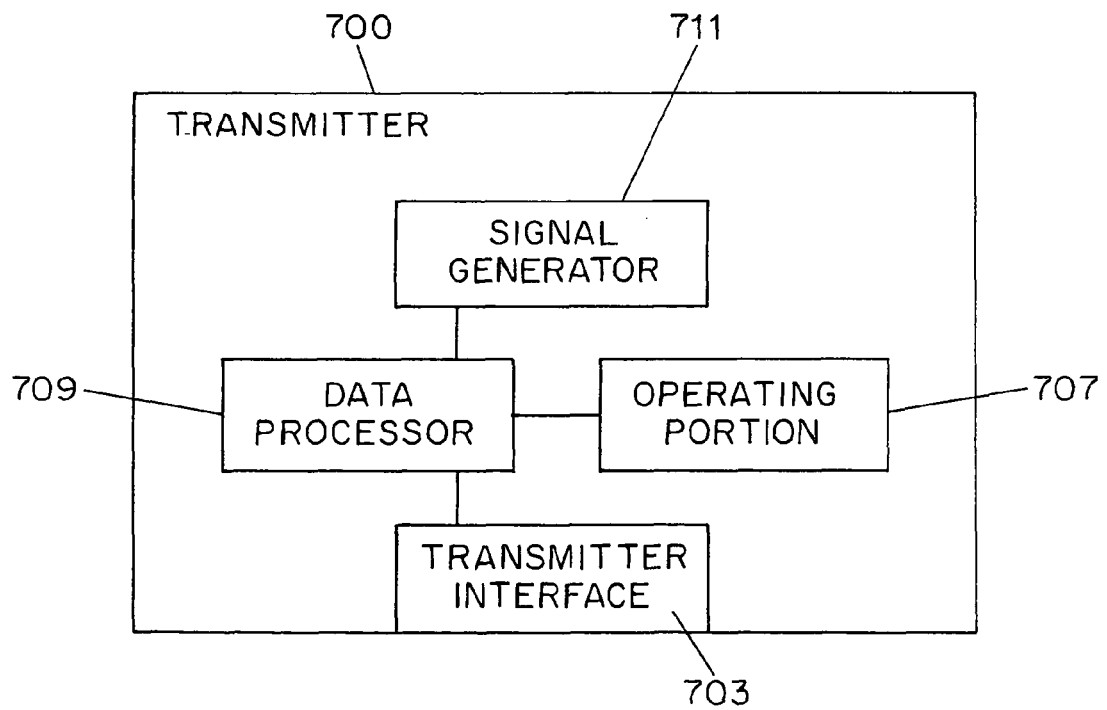
FIG. 11 is a block diagram of a transmitter for coupling to the IC card of FIG. 10.

FIG. 11 illustrates transmitter 700 into which card 600 can be inserted. Specifically, transmitter 700 includes transmitter interface 703 for receiving card interface 607. Interfaces 703 and 607 are electrically compatible with each other, and may be in accordance with the PCMCIA interface standard. Before entering the subject vehicle, the user needs to couple interface 607 to interface 703. To gain entry to the vehicle, the user needs to depress a START button in operating portion 707 of the transmitter to initiate an RF signal directed to the receiver of system 343. It should be noted at this point that a PARK button is also provided in portion 707 for initiating automatic parking described before.

Upon detecting a depression of the START button, data processor 709 communicates with card processor 611 to have a copy of the above-described security data and personal preference data in memory 603 transferred to transmitter 700. Data processor 709 formats the received data pursuant to a predetermined protocol, and causes signal generator 711 to transmit the RF signal, whose waveform is modulated by the formatted data.

After the receiver of system 343 receives the transmitted signal, it recovers therefrom the security data and personal preference data. Processor 103 then performs a security check based on the received security data. If it determines that the user is not an authorized user, he/she would be denied access to the vehicle. Otherwise, processor 103 causes the driver door of the vehicle to be unlocked, and accords the proper operating privilege. In addition, processor 13 stores the received personal preference data in memory 107. Based on such received data, processor 103 effects the preferred vehicle settings to personalize the vehicle functions.

It will be appreciated that, instead of an IC memory, the aforementioned security and personal preference data may be stored in a magnetic medium such as a standard magnetic stripe, or in the form of a one-dimensional or two dimensional bar-code on a card. In the case where the bar-code is used, security system 343 may incorporate a conventional bar-code scanner for reading the encoded data. In addition, the stored data need not be transmitted via an RF medium. It may well be transmitted via a laser, infrared or any other medium, or through a telephone network, a private network, a cellular network, the Internet or any other network, as long as the vehicle is equipped with the appropriate data receiver.

Depression of LIGHTS key 211*i* in FIG. 2 invokes on display 205 displayed options including, for example, all lights on/off, running lights on/off and flashers on/off. For each option, the user may further select the light operation durations, and set weather, hazardous, ambient light conditions under which the light would be automatically turned on.

Depression of WARNINGS key 211*j* prompts processor 103 to display on display 205 predetermined advisories and cautions on operating the vehicle, such as the advisory "adjusting seat while driving could result in loss of vehicle control."

Upon a start-up of system 100, periodically or when DIAGNOSTICS key 211*k* is depressed, processor 103 polls each system therein for a self-test result. The system, when polled, performs an active self-test and reports the test results to diagnostic system 349. The latter analyzes the results, and communicates any exceptions to processor 103. Processor 103 causes display 205 to display a clear status for those systems having no identifiable problem, and to graphically indicate the locations of identified irregularities for the other systems, along with messages describing the irregularities. Some irregularities may cause processor 103 to restrict certain vehicle operations until a corrective action therefor is taken.

The exception data received by processor 103 is stored in memory 107. Alternatively, they may be stored in a secure storage such as a "black box" which would survive an accident involving the subject vehicle. In the event of an accident, the exception data would be retrievable for determination of any mechanical cause for the accident.

Key 211*l* is currently unused. However, in accordance with an aspect of the invention, key 211*l* can be programmed to replace any function key in system 100 and its associated function. For that matter, as a provision for the user preferences, system 100 allows the user to re-program or re-designate each function key in system 100 to realize his/her preferred key arrangement. The re-designation is effected by the user's stepping through a menu-driven program, and registered by processor 103 as one of that user's preferences.

Depression of DEMO key 211*m* allows the user to access a self-guided demonstration provided by demonstration system 353. When the vehicle is in a showroom before its sale, the demonstration comprises a multimedia presentation on display 205, providing sales-type information including information on each feature and aspect of the vehicle, and functions afforded by master control interface 117. After the sale of the vehicle, the demonstration may include pre-recorded video programs for showing on display 205 operating procedures to realize different vehicle functions. In particular, such video programs demonstrate step-by-step operations of interface 117 to implement such functions as smart driving, obtaining weather and traffic information, etc. Thus, with this demonstration capability, a user who is not familiar with the subject vehicle can instantly learn to manage the various vehicle functions.

In accordance with another aspect of the invention, demonstration system 353 may be put in a rehearsal mode in which a prospective vehicle user can be trained and tested for his/her dexterity and familiarity with the vehicle functions. In such a rehearsal mode, traffic situations and vehicle conditions are simulated on display 205. At the same time, the prospective user is required to operate master control interface 117 to properly handle each given scenario. Only after satisfying the operating requirements, may the prospective user be granted the aforementioned access card (or "driver's permit") according the appropriate operating privilege.

Depression of RESET key 211*n* allows the user to reset/restart selected systems in system 100 for reasons of malfunction or nonperformance. The reset is accomplished by reset system 357, and can also be selected by depressing MENU key 219*c* or INDEX key 219*g* to be described. When a system is reset, power to the system is temporarily cut off. After regaining power, the reset system runs a restarting routine, and either resumes normal operation or identifies any problems to processor 103. In the latter case, processor 103 posts necessary messages to alert the user of the reported problems.

Operating keys 215 relate to the functions provided by operation control subsystem 136. With SHIFT key 215*a*, each other key on interface 117 corresponds to two functions depending on whether the key is depressed together with SHIFT 215*a*.

Depression of ENTER key 215*b* allows the user to initiate an action. If no action is required, depression of key 215*b* causes generation of a warning tone.

Depression of ZOOM(+) key 215*c* allows the user to obtain information not presently displayed, thereby providing other related subjects such as owner's manual material, tips, warnings, cautions, etc.

Depression of ZOOM AWAY(−) 215*d* effects the inverse function to depression of key 215*c*. That is, it allows the user to leave a related subject to continue with the original subject.

Depression of SET-UP key 215*e* allows the user to set parameters in system 100, which affect the functions of master control interface 117, selected aspects of the vehicle, priority of menu selections, access by other users to the hardware and software of the vehicle, etc. To facilitate setting of new parameters, after key 215*e* is depressed, operation control subsystem 136 causes display 205 to show thereon information about installed features, accessories, options, original equipment, dealer installed equipment, after market installations/removals, etc. In addition, information about the vehicle's capabilities, safety features, legal requirements, equipment installers, repair facilities, maintenance records, software revisions and updates, etc., which is stored in subsystem 136, may be accessed and reviewed using the set-up function as well.

In this illustrative embodiment, a windows based operating system of the type of the MICROSOFT WINDOWS operating system is installed on system 100. Specifically, a copy of the operating system software is stored in memory 107. Utilizing such an operating system, processor 103 can be programmed to control display 205 to provide organized data presentation through one or more windows.

By depressing SPLIT SCREEN key 215*f*, followed by clicking and dragging indicator device 227 or 229, multiple windows can be created on display 205. Advantageously, with multiple windows, certain actions can be effectively coordinated and cross-checked. For example, a vehicle function may be monitored in a first window while it is modified via menu selection in a second window. As a result, the modification can be immediately observed in the first window. Thus, with multiple windows, various menus and vehicle functions can be simultaneously accessed and monitored.

Figure 12:
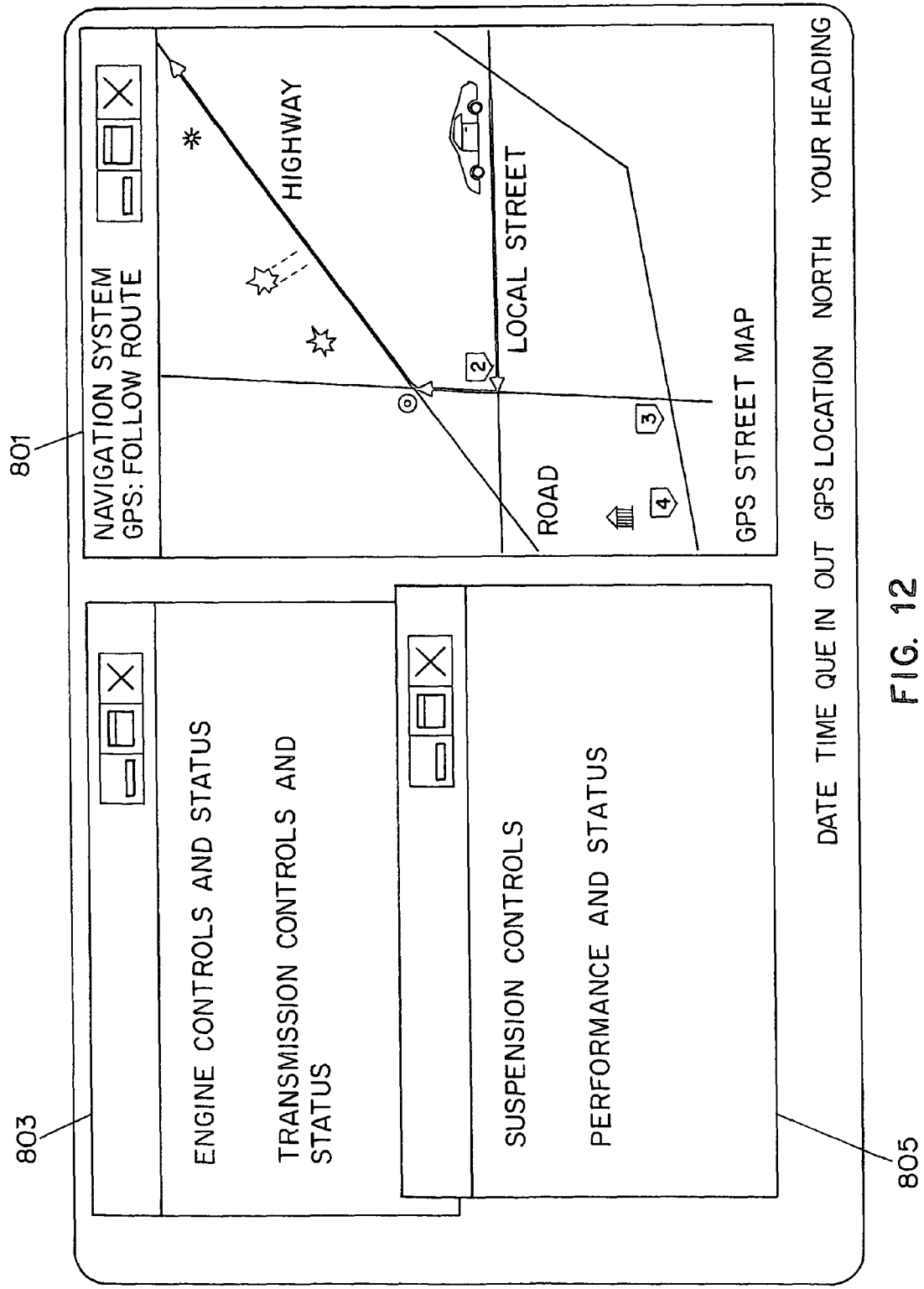
FIG. 12 illustrates multiple screens on the display when the interface of FIG. 2 is put in a split screen mode.

FIG. 12 illustrates multiple windows numerically denoted 801, 803 and 805, respectively, created on display 205 using the SPLIT SCREEN capability. As shown in FIG. 12, the user may utilize window 753 to realize the navigation function provided by navigation system 329. At the same time, windows 755 and 757 respectively provide first and second menus for the user's selection.

Depression of RELEASE key 215*g* at a particular screen effects the "enter" function, followed by an immediate return to a predetermined screen such as the main menu or "home" screen. Thus, unlike key 215*d*, depression of key 215*g* does not provide an incremental return to a previous screen, but an instant return to the home screen.

BRIGHTNESS key 215*h* comprises a standard variable resistor such that when it is pushed one way (the other way), the intensity of display 205 is increased (decreased). Utilizing the proper intensity, the user can readily view display 205 under different ambient light conditions (e.g., night time, excess glare, bright sun, etc.).

Figure 13:
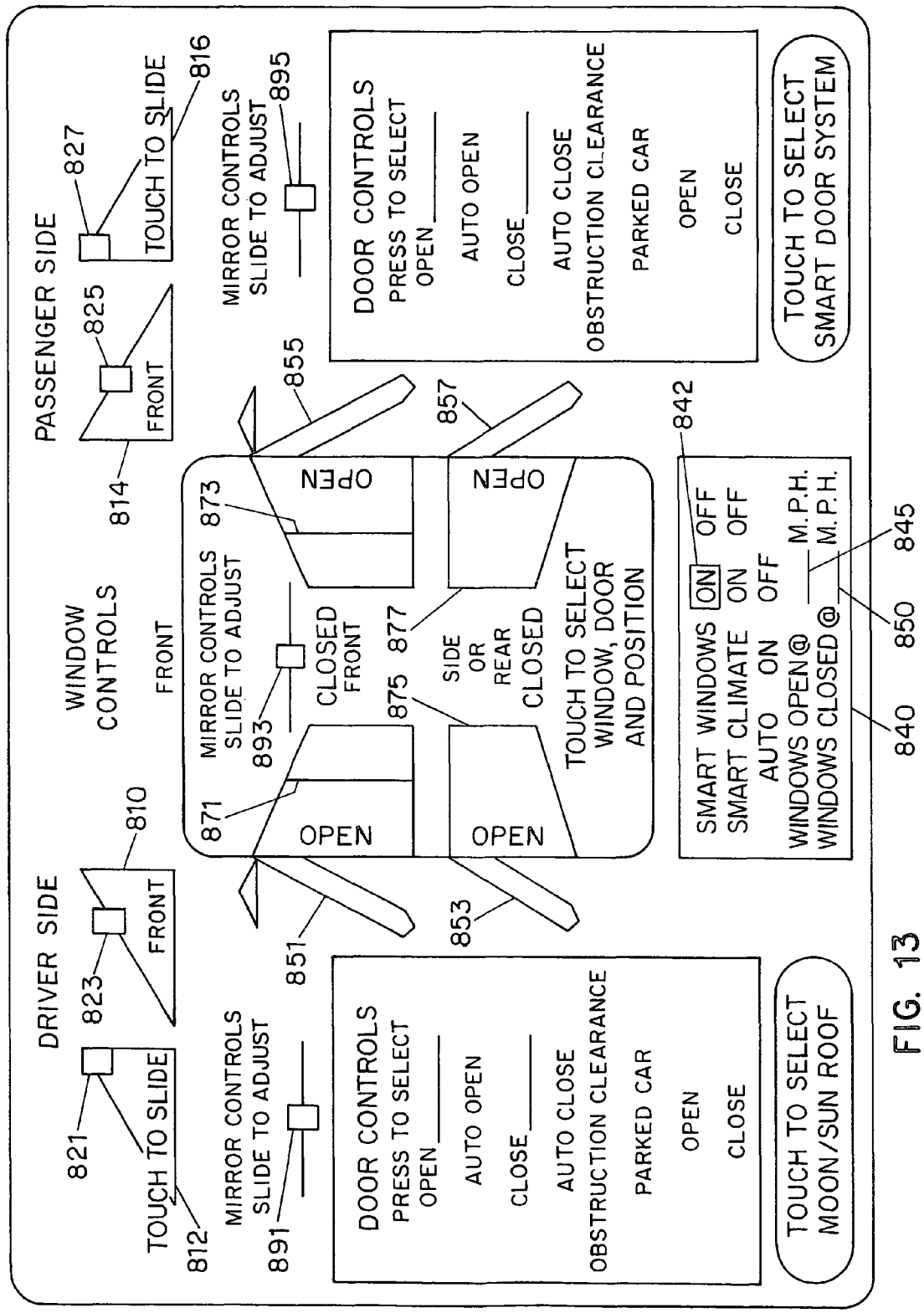
FIG. 13 is a display screen for adjusting windows and mirrors, and opening/closing doors of the vehicle in accordance with the invention.

Access keys 232 relate to functions provided by access control subsystem 139 in FIG. 1. Depression of WINDOWS key 232*a* invokes the screen of FIG. 13 on display 205. As shown in FIG. 13, triangles 810, 812, 814 and 816 correspond to the driver side front window, driver side rear window, passenger side front window and passenger side rear window, respectively. Indicators 821, 823, 825 and 827 on the hypotenuses of the respective triangles indicate the extents to which the corresponding windows are open. The user may touch the indicator on the screen to raise (or lower) it along the hypotenuse. In response, processor 103 causes access control subsystem 139 to close (or open) the window accordingly. Alternatively, the user may operate indicator device 227 or 229 to point at one of the indicators and drag same along the hypotenuse to control the corresponding window opening.

In addition, a SMART WINDOWS function on sub-screen 840 may be selected by touching ON option 842 on the screen or pointing and clicking at same. With the SMART WINDOWS function selected, for example, subsystem 139 causes the windows to be completely closed upon a shut-off of the engine or an activation of air conditioning. When coupled with a SMART CLIMATE function to be described, the SMART WINDOWS function includes slightly opening selected windows to vent out excess heat prior to the user's arrival, thereby pre-conditioning the vehicle. In addition, when an AUTO function on sub-screen 840 is selected, the user can specify the vehicle speed at which the driver side front window is made completely open or closed. By touching on the screen, or pointing and clicking at blank 845 or blank 850, choices of speed are listed beneath the blank. For example, by selecting a zero speed for blank 845 ahead of a toll plaza, the window in question would be completely opened when the vehicle stops at a toll booth, thereby conveniently allowing the user to pay tolls.

The screen of FIG. 13 may also be invoked by depressing DOORS key 232*b*. Flaps 851, 853, 855 and 857 in FIG. 13 correspond to the driver side front door, driver side rear door, passenger side front door and passenger side rear door, respectively. By touching one of the flaps on the screen with a finger or pointing and clicking at the flap with indicator 227 or 229, subsystem 139 including a door actuator controllably closes the corresponding door if it is previously open, and vice versa.

Subsystem 139 also includes door sensors to detect any obstacle in the way of closing or opening each door. Upon detection of any such obstacle, subsystem 139 immediately suspends the door movement until the obstacle is removed. In this instance, both the front doors are not fully open because of detected obstacles. This fact is indicated by lines 871 and 873 marking the extents to which the respective doors are open and closed. On the other hand, both the rear doors in this instance are fully open as the corresponding lines 875 and 877 have moved all the way toward the center.

It should be apparent by now that the above door control may also be effectuated by voice command. For that matter, the locking of the individual doors after they are closed, or activation of the child lock system may also be realized by voice command.

Depression of MIRRORS key 232*c* again invokes the screen of FIG. 13. Indicators 891, 893 and 895 correspond to the left rear-view mirror, center rear-view mirror and right rear-view mirror, respectively. The user may operate indicator device 227 or 229 to point at one of the indicators and drag same (or utilize the touch-screen capability) to left or right to tilt the corresponding mirror toward left or right accordingly.

Subsystem 139 also includes mirror heaters, sensors and actuators. Based on the above personal preference data, subsystem 139 causes the mirror heaters to defrost the mirrors under certain specified temperature and weather conditions. Upon the sensors' detecting a tight parking space for example, subsystem 139 causes the actuators to fold back one or both external mirrors to avoid damages. In addition, processor 103 coordinates the action of electronic transmission/throttle system 325 with that of the mirror actuators such that when the gear is put in reverse, the actuators automatically adjust the mirrors to provide a good rear view while the vehicle is backing up.

It will be appreciated that subsystem 139 may also incorporate mirror enhancement techniques for self-dimming the mirrors or adjusting their clarity, density, opacity, reflectivity, color, zooming, etc. based on specified light conditions.

It should be noted at this point that as long as the screen of FIG. 13 is showing on display 205, the user can conveniently adjust the windows, doors and/or mirrors at the same time, without the need of depressing the corresponding access keys to invoke the screen repeatedly.

Figure 14:
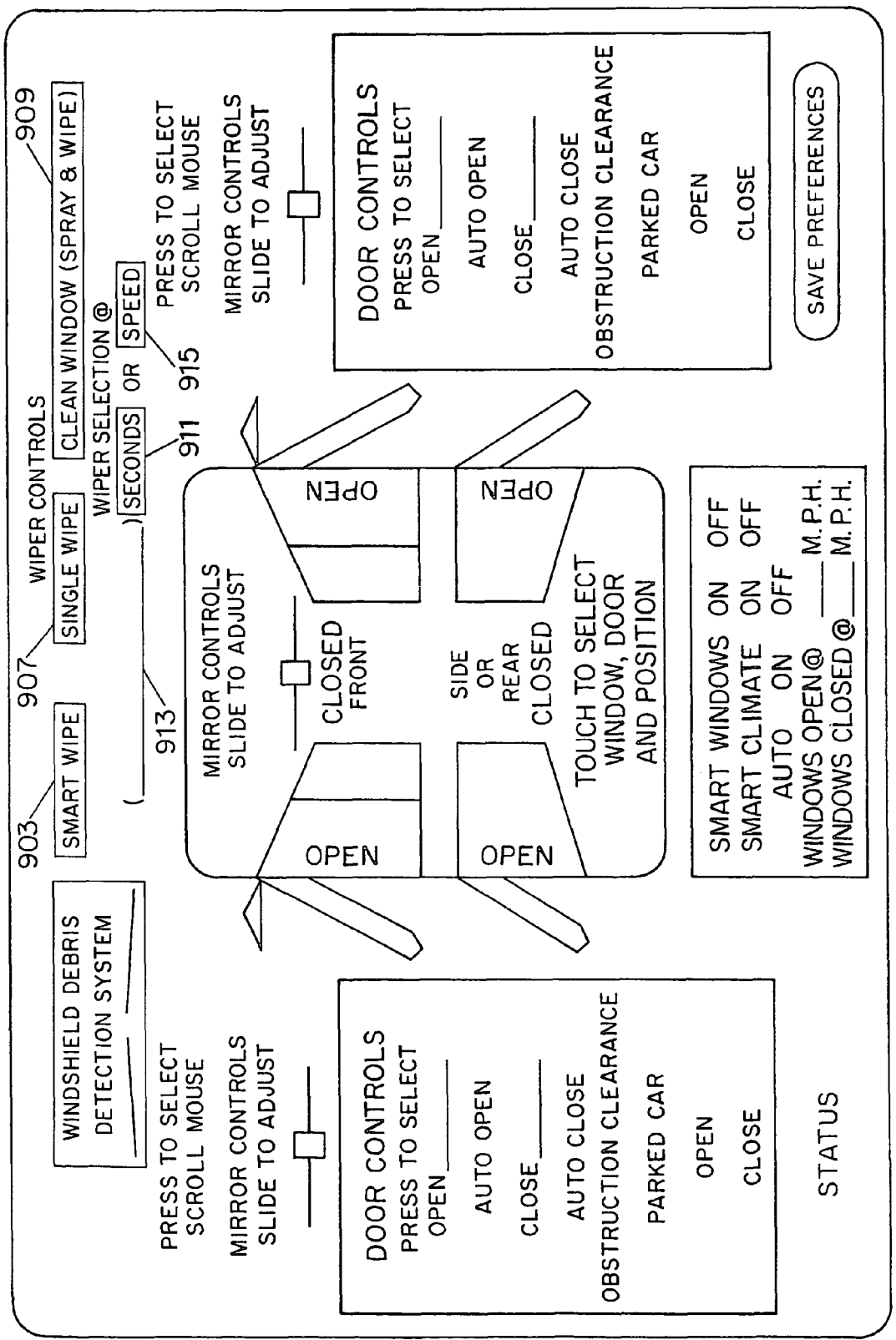
FIG. 14 is a display screen for, among other things, adjusting wipers in the vehicle in accordance with the invention.

Depression of WIPERS key 232*d* invokes the screen of FIG. 14. Subsystem 139 further comprises wipers, wiper actuators and a windshield debris detection system. The latter includes sensors which are attached to the windshield of the vehicle to determine the intensity of a vibration of the windshield. They also determine the frequency of the vibration whose intensity is above a predetermined threshold. This threshold accounts for the intensity of the normal windshield vibration of a moving vehicle. When SMART WIPE option 903 on the screen of FIG. 14 is selected, processor 103 causes the wiper actuators to operate the wipers in response to a vibration of above-normal intensity caused by rain, snow, insects, hail, and such falling on the windshield. The detection of such a vibration is communicated by the windshield debris detection system to processor 103, along with the information concerning the frequency of the vibration. Accordingly, processor 103 varies the rate of windshield sweeping with the communicated frequency. Thus, for example, in the SMART WIPE mode, the windshield wiping rate is adjusted lower when the vehicle stops in the rain, versus the vehicle running against the rain (i.e., rain drops falling on the windshield at a higher frequency).

Other wiper controls are also available on the screen of FIG. 14. For example, selection of SINGLE WIPE option 907 causes the wipers to sweep once across the windshield. Selection of CLEAN WINDOW option 909 causes spraying of cleaning liquid onto the windshield, followed a predetermined number of wipes. In addition, the speed of the wipers can be specified by selecting SECONDS option 911. After option 911 is selected, the user can point and click at blank 913 to select one of the displayed numbers, thereby specifying the wiper speed in terms of once so many seconds. Thus, option 911 is convenient for the user to implement intermittent wiping. To specify the speed of continuous wiping, the user may select SPEED option 915. After such an option is selected, the user can point and click at blank 913 to select one of the displayed speed levels ranging from slow to fast.

Depression of TRUNK STORAGE key 232*e* provides controlled access to the trunk/storage of the subject vehicle. In addition, it allows the user to program climate control system 1105 to be described to controllably cool or heat the trunk/storage to properly preserve the cargo. Moreover, it enables the user to instruct processor 103 to open (close) the trunk/storage upon a shut-off (start-up) of the engine.

Depression of UNDER HOOD key 232*f* releases the hood of the subject vehicle. Through processor 103, various systems may communicate to the hood mechanism controlling the release of the hood. For example, when certain fluid levels are detected low or components under the hood need repair or replacement, upon the user's agreeing to take a certain remedial action, processor 103 causes the hood mechanism to release the hood in anticipation of such an action. In addition, each time when the engine is started and the vehicle is ready to move, processor 103 checks with the hood mechanism to ensure that the hood has not be accidentally released.

Figure 15:
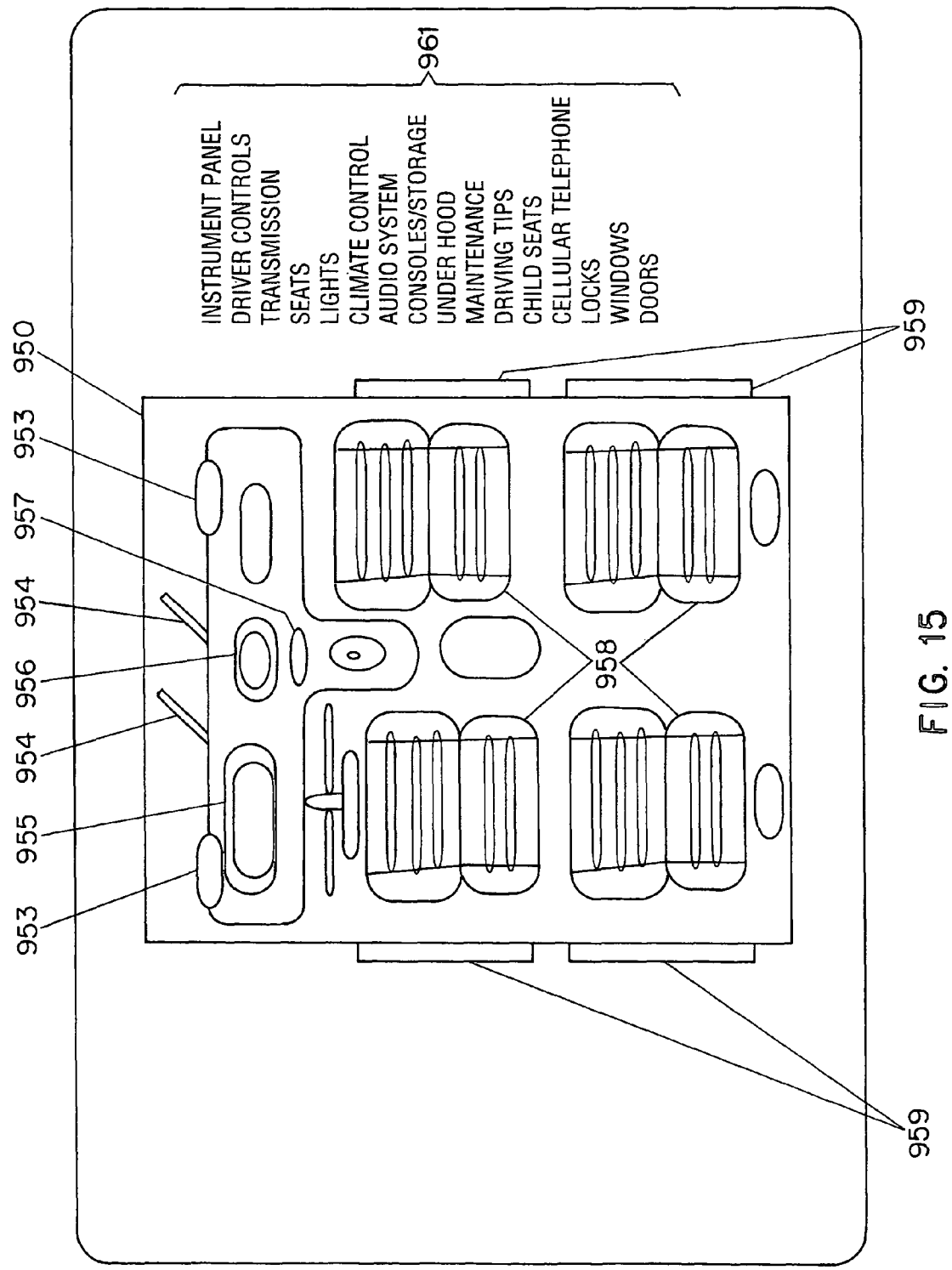
FIG. 15 is a display screen including a user's view of the vehicle for controlling and accessing information concerning different components in the vehicle in accordance with the invention.

Depression of USER'S VIEW key 292*g* invokes the screen of FIG. 15. However, this screen is the default screen or "home" screen on display 205. That is, it automatically comes on after the vehicle is started, even without depression of key 292*g*. In accordance with the invention, the screen of FIG. 15 allows the user to control and manage certain basic vehicle functions based on an intuitive approach, without the need of depressing any keys. To that end, subscreen 950 is used to graphically depict the user's view of the vehicle. By way of example, displayed items 953 through 959 in subscreen 950 depict the vents, windshield wipers, instrument panel, audio system, rear-view mirror, seats and windows/doors in the vehicle, respectively. It should be pointed out that the relative positions of these displayed items correspond to those of the depicted components in the actual vehicle. Knowing the relative positions of the components in the vehicle, the user can easily identify and point and click at selected items to efficiently control the corresponding components, and/or access information concerning them.

Specifically, when one of items 953 depicting a vent is selected, processor 103 causes the screen of FIG. 16 (described below) to be displayed for the user to adjust the air condition. When one of items 954 depicting a windshield wiper is selected, processor 103 causes the screen of FIG. 14 (described before) to be displayed for the user to adjust the wiper function. When item 955 depicting the instrument panel is selected, processor 103 causes the readings of the speedometer, tachometer, odometer and engine coolant temperature to be displayed. When item 956 depicting the audio system is selected, processor 103 causes the screen of FIG. 18 (described below) to be displayed for the user to adjust the audio system. When item 957 depicting the rear-view mirror is selected, processor 103 causes the screen of FIG. 13 (described before) to be displayed for the user to adjust the rear-view mirror and other mirrors. When one of items 958 depicting a seat is selected, processor 103 causes the screen of FIG. 16 to be displayed for the user to adjust the seat. Finally, when one of items 959 depicting a window/door is selected, processor 103 causes the screen of FIG. 13 to be displayed for the user to control the window/door. In addition, menu 961 including vehicle components which are not depicted is provided in the screen of FIG. 15 for the user's selection. Any selected component from the menu is highlighted to indicate its selection.

Accessory keys 219 relate to the functions provided by accessory control subsystem 143. Depression of SEATS key 219*a* invokes the screen of FIG. 16. By pointing and clicking at DRIVER selection 1005, processor 103 causes display 205 to show the current configuration of the driver seat, denoted 1007. Similarly, by pointing and clicking at one of displayed numerals "2" through "4" next to the word "PASSENGER," processor 103 causes display 205 to show the current configuration of the corresponding passenger seat.

The default configurations of the seats are defined by the personal preference data initially provided by the user. Thus, upon a start-up of system 100, processor 103 effects the default configurations. However, by pointing at indicators 1013 and 1015 and dragging same using indicator device 217 or 219 (or using the touch-screen capability), the user may accordingly adjust the height of the cushion and the incline of the back support of the seat, respectively. Nevertheless, for safety reasons not all configurations of the driver seat are allowed. The arm rest, if any, can be similarly adjusted. The lumbar support and massage capabilities and seat temperature can be selected as well. All of the above seat adjustments may be saved in memory 107.

Figure 17:
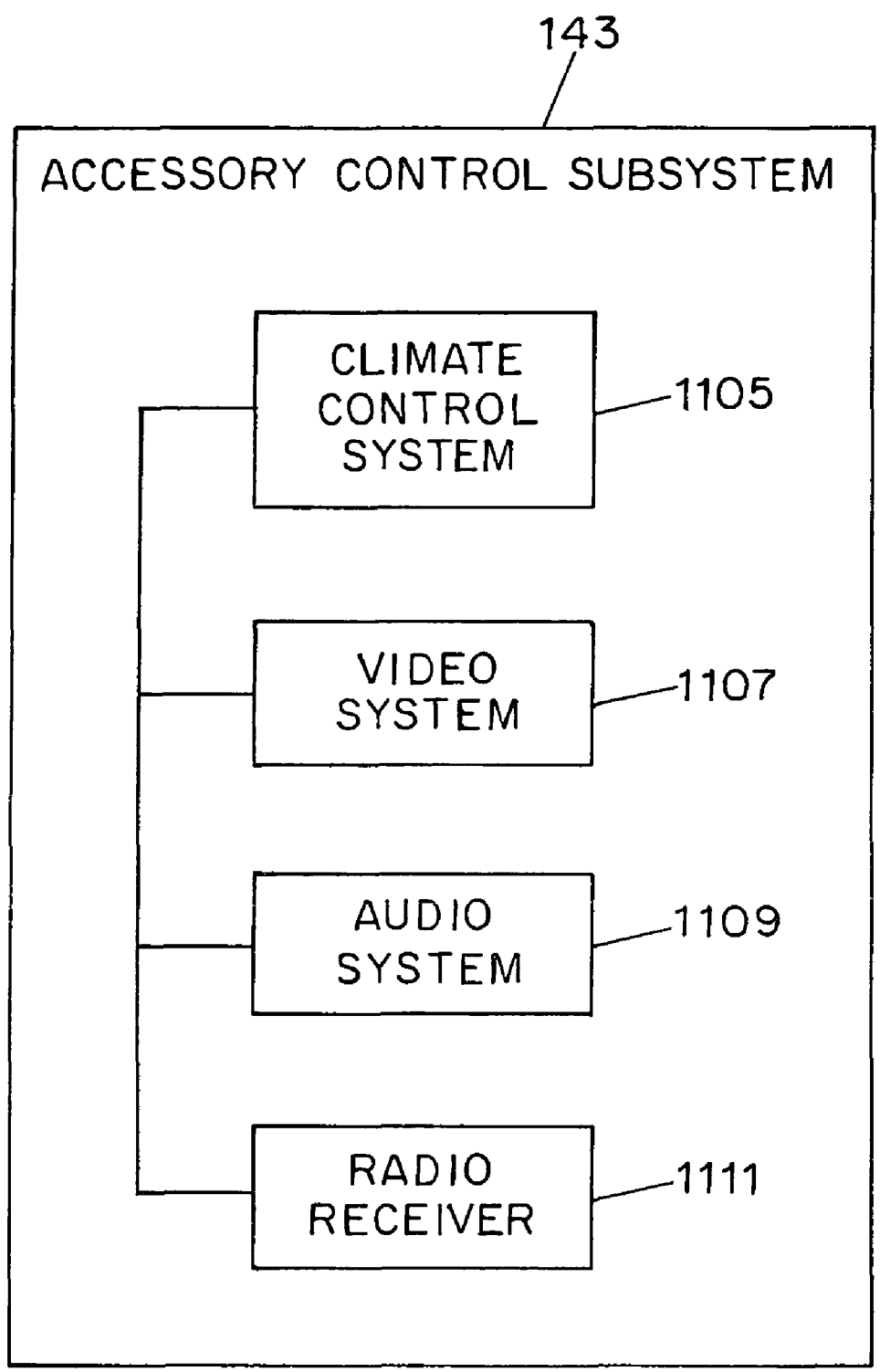
FIG. 17 is a block diagram of an accessory control subsystem in the system of FIG. 1.

As shown in FIG. 17, subsystem 143 includes climate control system 1105 for effecting the climate control of the vehicle. System 1105 may utilize additional power resources such as solar or reserved batteries to provide the necessary cooling/heating. Climate control system 1105 includes capabilities of providing air-conditioning/heating local to the driver and passengers, and also to the overall interior and trunk/storage space. System 1105 also manages air flows in the vehicle, and cooperates with access control subsystem 139 to achieve window controls. In addition, system 1105 includes air sensors to detect presence of contaminated and stale air. When such air is detected, system 1105 automatically vents it out before its spreading. Furthermore, processor 103 communicates to the user, through display 205, alarms regarding presence of any hazardous gas or fume in the air, and to what extent it is consumed by the user. System 1105 may also include onboard filtration devices to purify contaminated air.

Figure 16:
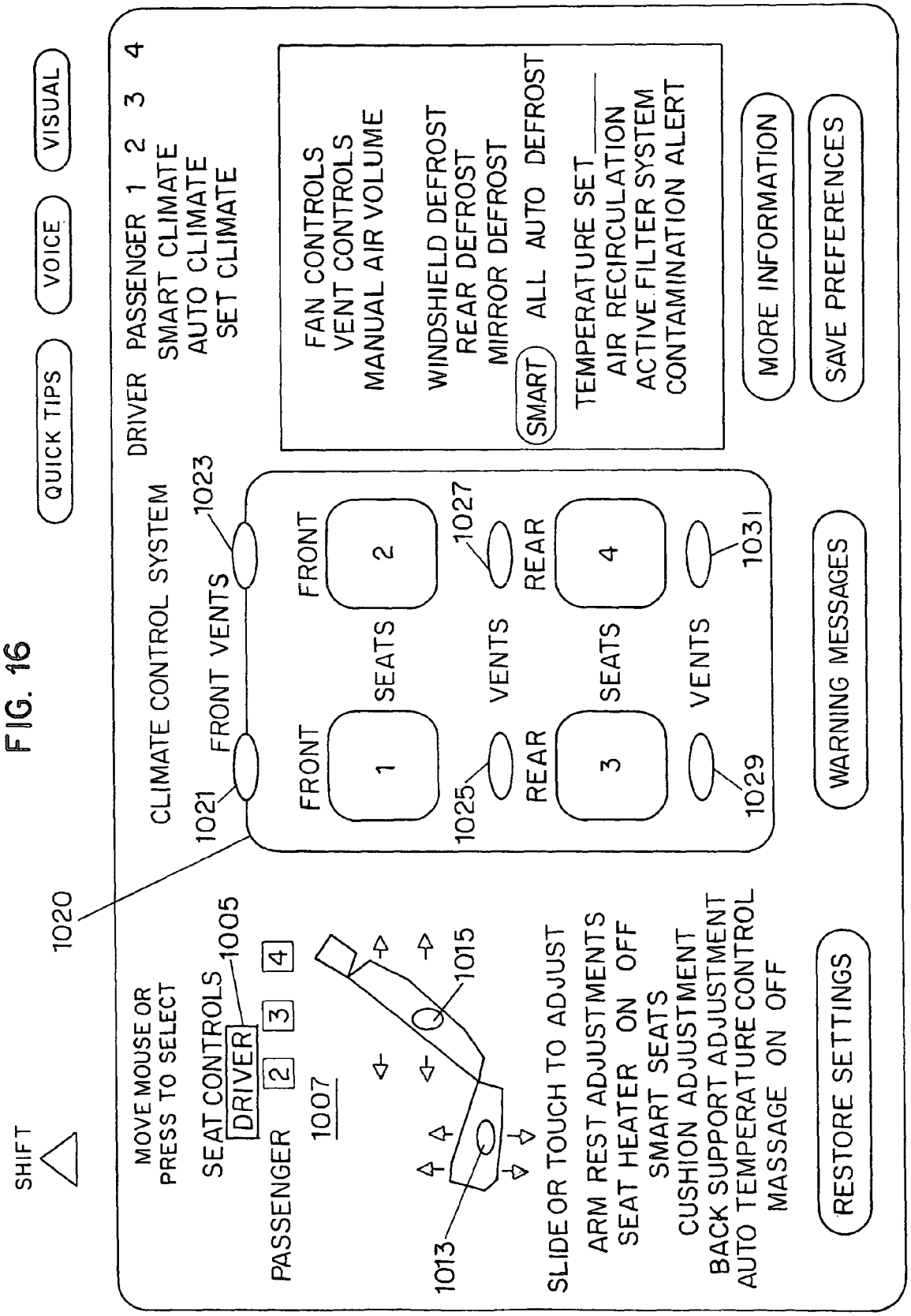
FIG. 16 is a display screen for adjusting seats and vents in the vehicle in accordance with the invention.

Depression of CLIMATE key 219*b* also invokes the screen of FIG. 16. Vent indicators 1021, 1023, 1025, 1027, 1029 and 1031 indicate the locations of respective vents in relation to the seats inside the vehicle, denoted 1020. By pointing and clicking at one of the vent indicators, the user may select the air temperature, and certain fan movement of the corresponding vent.

The individual vent settings are stored in memory 107. Thus upon a start-up of the vehicle, processor 103 receives and analyzes signals from various thermo-sensors in the vehicle. Based on such an analysis, processor 103 adjusts the temperatures and air movement of each vent according to the preferred settings.

Depression of MENU key 219*c* provides various menus on display 205 for selection. Such menus enable the user to access other features and capabilities of the vehicle which are not accessible by depressing any other keys on interface 117. This stems from the physical limit as to the number of keys used, without overwhelming the user. Thus, any items which are not shown may be accessed by a selection of an appropriate menu and/or further selections within the menu using the hot spot touch-screen capability, ENTER key 215*b*, or indicator device 227 or 229.

In addition, user preference selections may be presented by icon selection bars, hot keys, or function keys, or may be realized using a set-up screen. Moreover, where further information related to a displayed option or item would be helpful, an icon or similar graphical means identified as tips, warnings, etc. for accessing such information is provided.

Depression of QUICK TIPS key 219*d* enables the user to obtain answers to frequently asked questions (FAQs) and multimedia (i.e., audio, text and video) information regarding different features (e.g., safety features) of the vehicle, and various systems and subsystems embodied therein. A similar QUICK TIPS arrangement is described in copending, commonly assigned U.S. patent application Ser. No. 08/789,934 ("the '934 application"), entitled "Multimedia Information and Control System for Automobiles," which is hereby incorporated by reference as if fully set forth herein.

In this illustrative embodiment, the QUICK TIPS text is written in well-known hypertext markup language (HTML), and provides hyperlinks to owner's manual information, pictures, videos, captions, tips and warnings relating to the subject being reviewed. In addition, VOICE key 219*e* to be described may be selected to have the text read to the user, along with its display. Moreover, the QUICK TIPS feature may be indicated on display screens in the form of a selectable icon or option. By selecting such an option, the user is provided with further information on the items appearing on the screen.

It should be noted at this point that the audio medium is an important medium for presenting information to the user especially when he/she is driving and needs to keep his/her eyes on the road. As such, VOICE key 219*e* is provided to afford an option for voice presentation of instructions, displayed options, and description of various systems and features of the vehicle.

It should also be noted that it is advantageous to have a sound library stored in memory 107, from which the user is able to select favorable tones and sound clips to enhance the user's comprehension while he/she is driving. For example, when a displayed option is touched by the user on screen 205, a pre-selected tone is generated through the audio output, indicating that the option has been selected. Relying on the audio tone confirmation, as opposed to a visual confirmation, the user while driving can continually watch the road.

Depression of VISUAL key 219*f* provides different system views, and visual information including warnings, cautions, hazards, advisories, etc. It also provides a selection of display systems such as head-up display, projection, three-dimensional display, holographic and virtual reality systems which may be provided in the vehicle in combination with or in lieu of display system 205.

When coupled with SHIFT key 215*a*, depression of visual key 219*f* however activates video system 1107, which enables the user to play on display 205 selected videos from a video library (e.g., a compact disk (CD) jukebox) connected to system 100, to receive TV programs, to record and playback of pictures and video clips from such sources as video and digital cameras, and to run video files on weather and traffic downloaded from an external information source such as the Internet.

In this illustrative embodiment, the user is provided with an alternative way of looking up information about the vehicle, which is arranged by topics in alphabetical order. Depression of INDEX key 219*g* enables the user to enter a keyword relating to the subject of inquiry. Such a keyword may be entered by pointing and clicking at the appropriate letter keys on a displayed keyboard. After matching the keyword entry with one of the available topics, processor 103 causes the information concerning the topic to be presented in audio, video and/or text. A similar INDEX arrangement is also described in the '934 application.

Depression of LIGHTS key 219*h* enables the user to program the intensity of individual interior lights depending on the ambient light condition, and the usage thereof such as the duration of the respective on-times. The preferred light settings are stored in memory 107.

Figure 18:
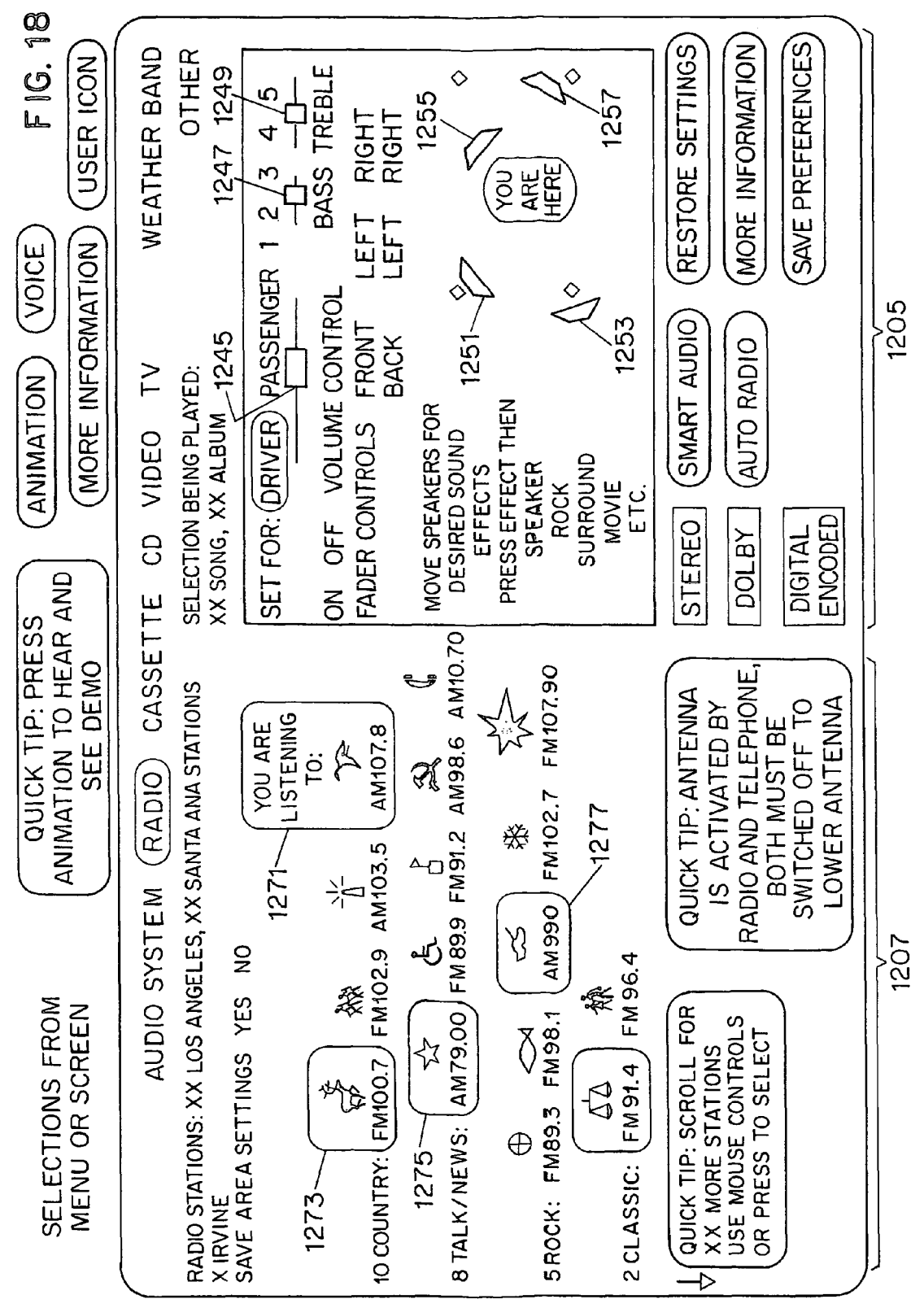

Depression of AUDIO SYSTEM key 219*i* invokes the screen of FIG. 18 on display 205. In this instance, audio portion 1205 for controlling audio system 1109 shares the same screen with radio portion 1207 for controlling radio receiver 1111. With audio system 1109, the user is able to distribute selected audio signals to driver and passenger locations. These signals are communicated, through processor 103, to such subsystems as headsets, earphones, directional speakers, etc.

As shown in FIG. 18, portion 1205 enables the user to set for each driver and passenger sound preferences. With the word "DRIVER" clicked on and highlighted, the user may use indicator device 227 or 229 to point at indicator 1245 and move same to adjust the volume of the audio output, indicator 1247 to adjust the bass level, and indicator 1249 to adjust the treble level. In addition, the user may relocate speakers with respect to the user location to obtain the optimum sound effects. For example, each speaker is placed on a track and can be driven by an actuator along the track to reposition it. The relocation of the speakers can be achieved by pointing at indicators 1251, 1253, 1255 and 1257 corresponding to the respective speakers, and dragging same to the desired individual locations using indicator device 227 or 229. Accordingly, processor 103 causes the actuators to physically move the speakers along the respective tracks to realize the desired arrangement. Portion 1205 also provides other options such as fader control, graphic presentation of sound events, and saving of the preferred audio settings.

Portion 1207 shows a listing of radio stations for selection. In accordance with an aspect of the invention, the frequencies of the selected stations are stored based on geographic locations such as Los Angeles, Santa Ana and Irvine. As is well known, the geographic coverage of each station is limited. As a user travels beyond the coverage, the broadcast from that station becomes too weak to receive. As such, processor 103 continually causes a frequency scanner to update the listed stations which are within the receiving range. The user may save a subset of the listed stations as his/her favorite stations according to the current vehicle location.

Advantageously, by saving certain favorite stations according to the locations which the user visits often, when the user travels from one such location to another, he/she can instantly change the listing to contain the corresponding favorite stations. As a result, the otherwise, cumbersome programming of the stations back and forth between the locations is obviated.

In the preferred embodiment, the favorite radio station frequencies are actually stored according to the GPS coordinates of the locations shown on portion 1207. Navigation system 329 periodically communicates the GPS coordinates of the current vehicle location to processor 103. The latter compares the communicated GPS coordinates with those of the locations in question. As soon as processor 103 determines that one such location is close to the current vehicle location within a predetermined range, processor 103 causes the listing of favorite stations associated with the new location to come on for selection.

In accordance with another aspect of the invention, for the user's convenience, the radio stations are categorized, and listed according to selected music types such as "country", "rock" and "classic", and selected program contents such as "talk/news". To that end, in each radio broadcast, the station transmits auxiliary data concerning its identity, e.g., an icon, signage and/or call number representing the station, and the type of program it airs, e.g., the type of music. In FM stereo broadcast for instance, the auxiliary data may be transmitted using subcarriers within a subsidiary communications authorization (SCA) band which lies above the 53 kHz portion of the station bandwidth allocated to the transmission of conventional stereo audio signals. A variety of prior art techniques may be used to modulate these subcarriers to transmit the auxiliary data. In addition, in accordance with the technique disclosed in U.S. Pat. No. 5,408,686 issued Apr. 18, 1995 to Mankovitz, the stereo audio portion of the station broadcast band, rather than the SCA band, may also be used for transmission of such auxiliary data.

The auxiliary data transmitted by each station is received by radio receiver 1111 in the form of a digital message signal. By decoding such a message signal, receiver 1111 recovers the aforementioned information concerning the station identity and the program type. Processor 103 screens the stations for the program types pre-selected by the user. The desired stations are then shown on display 205 according to the pre-selected program types. Illustratively, the stations are represented by the respective icons or signage, and frequencies. The user may point and click at (or touch on the screen) one of the icons representing the station which he/she wants to listen.

In this instance, the user has selected and is listening to one of the stations denoted 1271, whose icon is highlighted in a first color. In accordance with another aspect of the invention, the previously selected stations, such as stations 1273, 1275 and 1277 are highlighted in a second color. Advantageously, with the color highlighting, the user can readily back-track the previously selected stations and settle on one of them, or explore new, unheard stations.

It should be noted that from the screen of FIG. 18, the user may also access other entertainment systems such as cassette, CD, VCR and TV systems, and the weather band and other functions.

It should also be noted that the above selection of the displayed stations may be accomplished by voice command or depressing preset buttons. In addition, with the proper authorization, more than one user can save his/her preferred listing of stations, along with special notes about each station. In that case, when one wants to change the current listing of stations, he/she needs to enter a PIN before his/her preferred listing can be invoked. Moreover, the authorized user may also be privy to other users' preferred listings, and allowed to choose therefrom.

Depression of ANIMATION key 219j enables the user to view on display 205 animations relating to selected vehicle functions (e.g., automatic parking) which are being or to be performed. These animations are instructional, and help the user implement the functions in question and/or understand the effects thereof.

Like key 211l previously described, key 219k is reserved for future use in this instance.

Depression of ONLINE key 219l enables the user to access on-line systems through such communication links as telephone, wireless, cellular, satellite, radio spectrum, infrared and sonar connections. For example, while the vehicle is being operated, the user may choose to access the vehicle manufacturer's computer to run extensive diagnostic tests on the vehicle on-line. To that end, processor 103 establishes a communication link with the manufacturer computer. After an initial handshake between processor 103 and the manufacturer computer, the latter runs diagnostic routines on the vehicle systems through processor 103, and elicits from processor 103 information such as relevant operational parameters. Test results are generated by the manufacturer computer and transmitted to processor 103 for display. In addition, the manufacturer computer can correct or adjust any operational parameter values during the tests to improve the vehicle's performance. Similarly, any software upgrade or downloading for the vehicle systems can be realized through the on-line connection. Notices of recalls can also be transmitted to processor 103 for the user's information.

Depression of PHONE/MODEM key 219m allows the user to obtain mobile phone, facsimile modem and data modem connections through cellular and wireless networks.

Depression of PLANNERS/CALENDAR key 219n invokes reminder routines for informing the user of past and upcoming events. For example, certain maintenance reminders may be communicated by the aforementioned manufacturer computer to processor 103 through an on-line connection. Instructed by one of the reminder routines, processor 103 accesses systems such as navigation system 329 to identify the closest mechanic when the scheduled maintenance is due.

Referring back to FIG. 1, turn signal subsystem 147 in accordance with the invention not only provides the traditional function of activating turn signals in response to the user's initiation, but also causes furnishing of intelligence information on an impending turn. Once processor 103 is interrupted by subsystem 147 and notified of the impending turn into a particular direction, processor 103 causes detection subsystem 130 to sense any obstacles or moving objects in the street to which the vehicle is turning. Processor 103 then causes display 205 to display such obstacles and moving objects which may be hidden from the user's view, along with verbal and visual warnings of any foreseeable hazards. Thus, with such an assisted turning feature, the risk of an accident occurring during a turn is substantially reduced. Furthermore, in automatic driving, processor 103 orchestrates the actions of steering subsystem 132, brake subsystem 125 and electronic transmission/throttle system 325 to make a calculated move around an obstacle, or simply stops the vehicle at the turn to avoid any collision.

Speedometer subsystem 149 includes an accelerometer for evaluating the instantaneous speed of the vehicle. The speed information is communicated by subsystem 149 to processor 103 for use in navigation, automatic driving, automatic parking, etc. The speed information may also be stored with time and GPS information, and recorded in memory 107 or the aforementioned "black box". The memory content may be remotely accessed by a police authority, via a dial-up connection, to determine any speed violation, along with the associated time, and geographic location based on the GPS information.

Safety subsystem 151 includes restraint devices and airbags. In accordance with yet another aspect of the invention, subsystem 151 keeps track of the air-bag deployment and expiration dates. Advance air-bag expiration and recharge notifications are transmitted to processor 103. Also transmitted to processor 103 are data collected by subsystem 151 concerning usage of safety devices, tire and brake wear, etc., and data on intervals of maintenance performed on and long term durability of those components. All such safety information received by processor 103 can be accessed and displayed at the user's request. In addition, tips and support for the user's safety in response to certain vehicle malfunctions, failures or eminent dangers are issued by safety subsystem 151 via display 205.

Through processor 103, subsystem 151 cooperates with other systems in system 100 in certain events. For example, in an accident, as soon as subsystem 151 informs processor 103 of a deployment of an air-bag, processor 103 signals engine control system 319 to halt the engine activity, brake subsystem 125 to apply emergency braking, and suspension subsystem 129 to stabilize the vehicle. Processor 103 may further request from navigation system 329 GPS coordinates identifying the accident scene, and cause the audiovisual recording facilities in the vehicle to audio- and video-tape the accident scene, and emergency data to be transmitted to the authority to obtain help as described before.

Clock subsystem 154 provides time and date information. Relying on such information, processor 103 duly synchronizes system activities and keeps track of events. For example, utilizing the temporal information, processor 103 issues the above-described reminders and notifications in a timely manner. Similarly, the above-described planner functions such as scheduling maintenance are made possible with such information.

Suspension subsystem 129 provides, as mentioned before, wheel and stability control during the vehicle operation. In addition, subsystem 129 includes sensors for evaluating the current road condition, and adjusts the ride and comfort using yaw controls and dampeners in response to the evaluated condition. It also provides processor 103 with continuous updates about the road condition. Utilizing such updates, processor 103 coordinates the actions of other systems such as steering and brake subsystems to handle the road in a manner prescribed by the user.

Wheel subsystem 157 includes sensors for reading tire pressures, detection of loss of tire traction or tread, etc. Relevant information is communicated by subsystem 157 to processor 103 to issue necessary alarms including abnormally low tire pressures. Processor 103 also incorporates the received information in a concerted effort to achieve ride stability and smoothness.

Application module 161 which may be located close to master control interface 117 includes a standard interface such as an RS232 serial interface. Through this interface, the user or service personnel may use a conventional computer to update system programs and personal preference data stored in memory 107, or run diagnostic routines thereon to identify any system problems.

In an alternative embodiment, the standard interface in module 161, similar to interface 703, accepts IC card 600 previously described. In addition to the aforementioned security data and personal preference data, space is allocated in card memory 603 for storing system programs, diagnostic routines and header information. Such header information includes instructions for processing of certain contents of memory 603.

Utilizing a conventional IC card writer connected to a standard computer which may be remote from the vehicle, the user or authorized service personnel can revise the security data and personal preference data in memory 603, and load new programs, program upgrades and/or diagnostic routines onto the IC card. It should be noted that any change in the card memory content requires an initial entry of the aforementioned master key, or other authorized keys allowing limited access. The IC card may be inserted into the standard interface of application module 161 when system 100 is powered down. On power up, after system 100 is initialized, processor 103 checks the security data in memory 603. Upon verification of the security data, processor 103 reads the header information in memory 603, and accordingly causes a transfer of any new system programs from memory 603 to memory 107 and any upgrade to the existing programs. In addition, in the presence of any diagnostic routines in memory 603, processor 103 runs the routines directly off the IC card. Processor 103 then reads the personal preference data in memory 603 to effect the preferred settings of the vehicle functions.

The foregoing merely illustrates the principles of the invention. It will thus be appreciated that those skilled in the art will be able to devise numerous other systems which embody the principles of the invention and are thus within its spirit and scope.

For example, in the disclosed embodiment, control and management system 100 is illustratively used in an automobile. It will be appreciated that a person skilled in the art may also employ the inventive system in another type of vehicle such as a boat, an airplane, etc.

Finally, although control and management system 100, as disclosed, is embodied in the form of various discrete functional blocks, the system could equally well be embodied in an arrangement in which the functions of any one or more of those blocks or indeed, all of the functions thereof, are realized, for example, by one or more appropriately programmed processors or devices.

I claim:

1. A system in a vehicle for receiving entertainment presentations associated with a plurality of channels, comprising:
a receiver for receiving, from outside the vehicle, one or more signals containing at least data concerning one or more categories in which the entertainment presentations are classified based on contents thereof;
a processor configured to relate at least one collection of indicators to at least one of the categories based on the data, wherein the indicators in the collection represent channels associated with the at least one category;
a display element for showing thereon the at least one category and the indicators in the collection for selection to receive an entertainment presentation in the at least one category: and
an interface for selecting at least first and second indicators in the collection, the first selected indicator indicating a first selected status and the second selected indicator indicating a second selected status on the display element, the first and second selected statuses being different from an unselected status indicated by the first and second indicators before selection thereof, wherein one of the first and second selected indicators represents a channel with which a currently received entertainment presentation is associated.

2. The system of claim 1 wherein the first indicator and the second indicator are selected at different times.

3. The system of claim 1 wherein the first selected status is indicated by a highlight on the first selected indicator in a first color.

4. The system of claim 3 wherein the second selected status is indicated by a highlight on the second selected indicator in a second color.

5. The system of claim 1 wherein at least one of the channels represented by the indicators in the collection is a radio channel.

6. The system of claim 1 wherein at least one of the channels represented by the indicators in the collection is a television (TV) channel.

7. The system of claim 1 wherein at least one of the channels represented by the indicators in the collection is an audio channel.

8. The system of claim 1 wherein at least one of the channels represented by the indicators in the collection is a video channel.

9. The system of claim 1 wherein at least one of the channels represented by the indicators in the collection is a weather channel.

10. The system of claim 1 wherein one of the categories includes news.

11. The system of claim 1 wherein one of the categories includes a type of music.

12. The system of claim 1 wherein the indicators in the collection include signs identifying the channels represented thereby, respectively.

13. The system of claim 1 wherein the interface includes touch-screen technology.

14. The system of clam 1 the interface includes voice-command technology.

15. The system of claim 1 wherein the interface includes a joystick-like device.

16. A method for use in a system in a vehicle for receiving entertainment presentations associated with a plurality of channels, the system including a display element, the method comprising:
receiving, from outside the vehicle, one or more signals containing at least data concerning one or more categories in which the entertainment presentations are classified based on contents thereof;
relating at least one collection of indicators to at least one of the categories based on the data, wherein the indicators in the collection represent channels associated with the at least one category;

showing, on the display element, the at least one category and the indicators in the collection for selection to receive an entertainment presentation in the at least one category; and allowing a user to select at least first and second indicators in the collection, the first selected indicator indicating a first selected status and the second selected indicator indicating a second selected status on the display element, the first and second selected statuses being different from an unselected status indicated by the first and second indicators before selection thereof, wherein one of the first and second selected indicators represents a channel with which a currently received entertainment presentation is associated.

17. The method of claim 16 wherein the first indicator and the second indicator are selected at different times.

18. The method of claim 16 wherein the first selected status is indicated by a highlight on the first selected indicator in a first color.

19. The method of claim 18 wherein the second selected status is indicated by a highlight on the second selected indicator in a second color.

20. The method of claim 16 wherein at least one of the channels represented by the indicators in the collection is a radio channel.

21. The method of claim 16 wherein at least one of the channels represented by the indicators in the collection is a TV channel.

22. The method of claim 16 wherein at least one of the channels represented by the indicators in the collection is an audio channel.

23. The method of claim 16 wherein at least one of the channels represented by the indicators in the collection is a video channel.

24. The method of claim 16 wherein at least one of the channels represented by the indicators in the collection is a weather channel.

25. The method of claim 16 wherein one of the categories includes news.

26. The method of claim 16 wherein one of the categories includes a type of music.

27. The method of claim 16 wherein the indicators in the collection include signs identifying the channels represented thereby, respectively.

28. The method of claim 16 wherein at east one of the first and second indicators is selected using a touch-screen technique.

29. The method of claim 16 wherein at least one of the first and second indicators is selected using a voice-command technique.

30. The method of claim 16 wherein at least one of the first and second indicators is selected using a joystick-like device.

31. A system in a vehicle for receiving entertainment presentations associated with a plurality of channels, comprising:

a receiver for receiving, from outside the vehicle, one or more signals containing at least data concerning one or more categories in which the entertainment presentations are classified based on contents thereof;

a processor configured to relate at least one collection of indicators to at least one of the categories based on the data, wherein the indicators in the collection represent channels associated with the at least one category;

a display element for showing thereon the at least one category and the indicators in the collection for selection to receive an entertainment presentation in the at least one category; and an interface for selecting at least one of the indicators in the collection which indicates a first status, the selected indicator indicating a second stats and representing a channel from which an entertainment presentation is currently received.

32. The system of claim 31 wherein status is indicated by a colored highlight on the indicator.

33. The system of claim 31 wherein the second status is indicated by a colored highlight on the selected indicator.

34. The system of claim 31 wherein at least one of the channels represented by the indicators in the collection is a radio channel.

35. The system of claim 31 wherein at least one of the channels represented by the indicators in the collection is a video channel.

36. The system of claim 31 wherein at least one of the channels represented by the indicators in the collection is a video channel.

37. The system of claim 31 wherein at least one of the channels represented by the indicators in the collection is a weather channel.

38. The system of claim 31 wherein one of the categories includes news.

39. The system of claim 31 wherein one of the categories includes a type of music.

40. The system of claim 31 wherein the indicators in the collection include signs identifying the channels represented thereby, respectively.

41. The system of claim 31 wherein the interface includes touch-screen technology.

42. The system of claim 31 wherein the interface includes voice-command technology.

43. The system of claim 31 wherein the interface includes a joystick-like device.

44. A method for use in a system in a vehicle for receiving entertainment presentations associated with a plurality of channels, the system including a display element, the method comprising:

receiving, from outside the vehicle, one or more signals containing at least data concerning one or more categories in which the entertainment presentations are classified based on contents thereof;

relating at least one collection of indicators to at least one of the categories based on the data, wherein the indicators in the collection represent channels associated with the at least one category;

showing, on the display element, the at least one category and the indicators in the collection for selection to receive an entertainment presentation in the at least one category; and allowing a user to select at least one of the indicators in the collection which indicates a first status, the selected indicator indicating a second status and representing a channel from which an entertainment presentation is currently received.

45. The method of claim 44 wherein the first status is indicated by a colored highlight on the indicator.

46. The method of claim 44 wherein the second status is indicated by a colored highlight on the selected indicator.

47. The method of claim 44 wherein at least one of the channels represented by the indicators in the collection is a radio channel.

48. The method of claim 44 wherein at least one of the channels represented by the indicators in the collection is a TV channel.

49. The method of claim 44 wherein at least one of the channels represented by the indicators in the collection is a video channel.

50. The method of claim 44 wherein one of the categories includes news.

51. The method of claim 44 wherein one of the categories includes news.

52. The method of claim 44 wherein one of the categories includes a type of music.

53. The method of claim 44 wherein the indicators in the collection include signs indentifying the channels represented thereby, respectively.

54. A system in a vehicle for receiving entertainment presentations associated with a plurality of channels, comprising:
    a receiver for receiving, from outside the vehicle, one or more signals containing at least data concerning one or more categories in which the entertainment presentations are classified based on contents thereof;
    a processor configured to relate, based on the data, at least a first collection of one or more indicators and a second collection of one or more indicators to first and second categories, respectively, wherein the one or more indicators in the first collection represent one or more channels associated with the first category, and the one or more indicators in the second collection represent one or more channels associated with the second category; and
    an interface for presenting the at least first and second collections of one or more indicators according to the respective first and second categories simultaneously, wherein at least a first indicator in the first collection is selectable to receive a currently-transmitted entertainment presentation in the second category which is associated with a channel represented by the second indicator.

55. The system of claim 54 wherein the first indicator when selected indicates a selected status.

56. The system of claim 55 wherein the selected status is indicated by a colored highlight on the first indicator.

57. The system of claim 54 wherein the channel represented by the first indicator is a radio channel.

58. The system of claim 54 wherein the channel represented by the first indicator is a TV channel.

59. The system of claim 54 wherein the channel represented by the first indicator is a video channel.

60. The system of claim 54 wherein the channel represented by the first indicator is a weather channel.

61. The system of claim 54 wherein one of the categories includes news.

62. The system of claim 54 wherein one of the categories includes a type of music.

63. The system of claim 54 wherein the first indicator includes a sign identifying the channel represented thereby.

64. The system of claim 54 wherein the interface includes touch-screen technology.

65. The system of claim 54 wherein the interface includes voice-command technology.

66. The system of claim 54 wherein the interface includes a joystick-like device.

67. The system of claim 54 wherein the interface includes a display element.

68. A method for use in a system in a vehicle for receiving entertainment presentations associated with a plurality of channels, comprising:
    receiving, from outside the vehicle, one or more signals containing at least data concerning one or more categories in which the entertainment presentations are classified based on contents thereof;
    relating, based on the data, at least a first collection of one or more indicators and a second collection of one or more indicators to first and second categories. respectively, wherein the one or more indicators in the first collection represent one or more channels associated with the first category, and the one or more indicators in the second collection represent one or more channels associated with the second category; and
    presenting the at least first and second collections of one or more indicators according to the respective first and second categories simultaneously, wherein at least a first indicator in the first collection is selectable to receive a currently-transmitted entertainment presentation in the first category which is associated with a channel represented by the first indicator, and at least a second indicator in the second collection is selectable to receive a currently-transmitted entertainment presentation in the second category which is associated with a channel represented by the second indicator.

69. The method of claim 68 wherein the first indicator when selected indicates a selected status.

70. The method of claim 69 wherein the selected status is indicated by a colored highlight on the first indicator.

71. The method of claim 69 wherein the channel represented by the first indicator is a radio channel.

72. The method of claim 68 wherein the channel represented by the first indicator is a TV channel.

73. The method of claim 68 wherein the channel represented by the first indicator is a video channel.

74. The method of claim 68 wherein the channel represented by the first indicator is a weather channel.

75. The method of claim 68 wherein one of the categories includes news.

76. The method of claim 68 wherein one of the categories includes a type of music.

77. The method of claim 68 wherein the first indicator includes a sign identifying the channel represented thereby.

78. The method of claim 68 wherein the first indicator is selectable using a touch-screen technique.

79. The method of claim 68 wherein the first indicator is selectable using a voice-command technique.

80. The method of claim 68 wherein the first indicator is selectable using a joystick-like device.

81. A system in a vehicle for receiving entertainment presentations, comprising:
    a receiver for receiving, from outside the vehicle, one or more signals containing at least data concerning one or more categories in which the entertainment presentations are classified based on contents thereof;
    a processor configured to relate at least one collection of indicators to at least one of the categories based on the data, wherein the indicators in the collection represent channels providing entertainment presentations in the at least one category; and
    an interface for presenting the indicators in the collection for selection to receive an entertainment presentation in the at least one category, wherein the interface is capable of providing a first indication that a first one of the indicators is in a first state, a second indication that a second one of the indicators is in a second state, and a third indication that a third one of the indicators is in a third state simultaneously.

82. The system of claim 81 wherein at least one of the channels includes a radio channel.

83. The system of claim 81 wherein the categories include types of music.

84. The system of claim 81 wherein the data includes information identifying the channels.

85. The system of claim 81 wherein the channels are screened for the at least one category pre-selected by a user.

86. The system of claim 81 wherein at least one of the first, second and third indications comprises a colored highlight on an indicator in the corresponding state.

87. The system of claim 81 wherein an indicator in one of the first, second and third states has been selected to currently receive an entertainment presentation from a channel represented thereby.

88. The system of claim 81 wherein an indicator in one of the first, second and third states was previously selected.

89. The system of claim 81 wherein an indicator in one of the first, second and third states is unselected.

90. A method for use in a system in a vehicle for receiving entertainment presentations, comprising:

receiving, from outside the vehicle, one or more signals containing at least data concerning one or more categories in which the entertainment presentations are classified based on contents thereof;

relating at least one collection of indicators to at least one of the categories based on the data, wherein the indicators in the collection represent charnels providing entertainment presentations in the at least one category; and presenting the indicators in the collection for selection to receive an entertainment presentation in the at least one category, wherein the interface is capable of providing a first indication that a first one of the indicators is in a first state, a second indication that a second one of the indicators is in a second state, and a third indication that a third one of the indicators is in a third state simultaneously.

91. The method of claim 90 wherein at least one of the channels includes a radio channel.

92. The method of claim 90 wherein the categories include types of music.

93. The method of claim 90 wherein the data includes information identifying the channels.

94. The method of claim 90 wherein the channels are screened for the at least one category pre-selected by a user.

95. The method of claim 90 wherein at least one of the first, second and third indications comprises a colored highlight on an indicator in the corresponding state.

96. The method of claim 90 wherein an indicator in one of the first, second and third states has been selected to currently receive an entertainment presentation from a channel represented thereby.

97. The method of claim 90 wherein an indicator in one of the first, second and third states was previously selected.

98. The method of claim 90 wherein an indicator in one of the first, second and third states is unselected.

* * * * *

UNITED STATES PATENT AND TRADEMARK OFFICE
CERTIFICATE OF CORRECTION

| | | |
|---|---|---|
| PATENT NO. | : 7,802,198 B2 | Page 1 of 1 |
| APPLICATION NO. | : 11/417474 | |
| DATED | : September 21, 2010 | |
| INVENTOR(S) | : Michael L. Obradovich | |

It is certified that error appears in the above-identified patent and that said Letters Patent is hereby corrected as shown below:

In column 26, line 3, claim 31, delete "stats" and insert --status--, therefor.

In column 26, line 15, claim 35, delete "video" and insert --TV--, therefor.

In column 47, lines 4-5, claim 50, delete "wherein one of the categories includes news." and insert --where at least one of the channels represented by the indicators in the collection is a weather channel--, therefor.

In column 27, line 33, claim 54, after "presentation in the" and before "second category", insert --first category which is associated with a channel represented by the first indicator, and at least a second indicator in the second collection is selectable to receive a currently-transmitted entertainment presentation in the--.

Signed and Sealed this
Twenty-fourth Day of January, 2012

David J. Kappos
*Director of the United States Patent and Trademark Office*